United States Patent
Michael et al.

(10) Patent No.: US 8,509,328 B2
(45) Date of Patent: Aug. 13, 2013

(54) RECEPTION APPARATUS, RECEPTION METHOD, PROGRAM, AND RECEPTION SYSTEM

(75) Inventors: Lachlan Bruce Michael, Saitama (JP); Yuken Goto, Tokyo (JP); Kenichi Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 223 days.

(21) Appl. No.: 12/836,710

(22) Filed: Jul. 15, 2010

(65) Prior Publication Data

US 2011/0019784 A1 Jan. 27, 2011

(30) Foreign Application Priority Data

Jul. 24, 2009 (JP) ................................ P2009-173610

(51) Int. Cl.
*H04K 1/10* (2006.01)

(52) U.S. Cl.
USPC ........... 375/260; 375/316; 375/346; 329/318; 329/278.1; 329/296; 455/63.1

(58) Field of Classification Search
USPC .............. 375/260, 316, 346; 329/318, 278.1, 329/296; 455/63.1
See application file for complete search history.

(56) References Cited

U.S. PATENT DOCUMENTS

2010/0040092 A1* 2/2010 Chang ........................... 370/516

FOREIGN PATENT DOCUMENTS

| EP | 1 182 817 | | 2/2002 |
|---|---|---|---|
| EP | 1 971 059 | | 9/2008 |
| GB | 2334836 | A * | 9/1999 |
| GB | 2449470 | A * | 11/2008 |
| JP | 2007-189646 | | 7/2007 |
| JP | 2007-228248 | | 9/2007 |

OTHER PUBLICATIONS

"Frame Structure channel coding and modulation for a second generation digital terrestrial television broadcasting system (DVB-T2)", DVB Document A122 Jun. 2008.
Japanese Office Action issued on May 21, 2013 in corresponding Japanese Application No. 2009-173610 filed on Jul. 24, 2009.
Japanese Office Action mailed on Feb. 26, 2013 in corresponding Japanese application No. 2009-173610 filed on Jul. 24, 2009, with English translation.
Yoshihisa Kishiyama, et al., Pilot channel using sector unique orthogonal sequence in Evolved UTRA downlink OFDM wireless access, Collected papers vol. 1 of the Communication society conference 2005 of the Institute of Electronics, Information and Communication Engineers, Sep. 7, 2005, p. 445, B-5-45.

* cited by examiner

*Primary Examiner* — Leila Malek
(74) *Attorney, Agent, or Firm* — Oblon, Spivak, McClelland, Maier & Neustadt, L.L.P.

(57) ABSTRACT

Disclosed herein is a reception apparatus including: an acquisition section configured to acquire an orthogonal frequency division multiplexing signal composed resultingly of signals transmitted by the orthogonal frequency division multiplexing method from a plurality of transmission apparatuses; a correction value calculation block configured to calculate a correction value for correcting a drift amount of the orthogonal frequency division multiplexing signal using the phase of either a first pilot signal or a second pilot signal extracted from the acquired orthogonal frequency division multiplexing signal, the first pilot signal being obtained from pilot signals which are in phase with one another coming from the plurality of transmission apparatuses, the second pilot signal being acquired from pilot signals which are out of phase with one another coming from the plurality of transmission apparatuses; and a correction block configured to correct the drift amount of the orthogonal frequency division multiplexing signal in accordance with the calculated correction value.

14 Claims, 13 Drawing Sheets

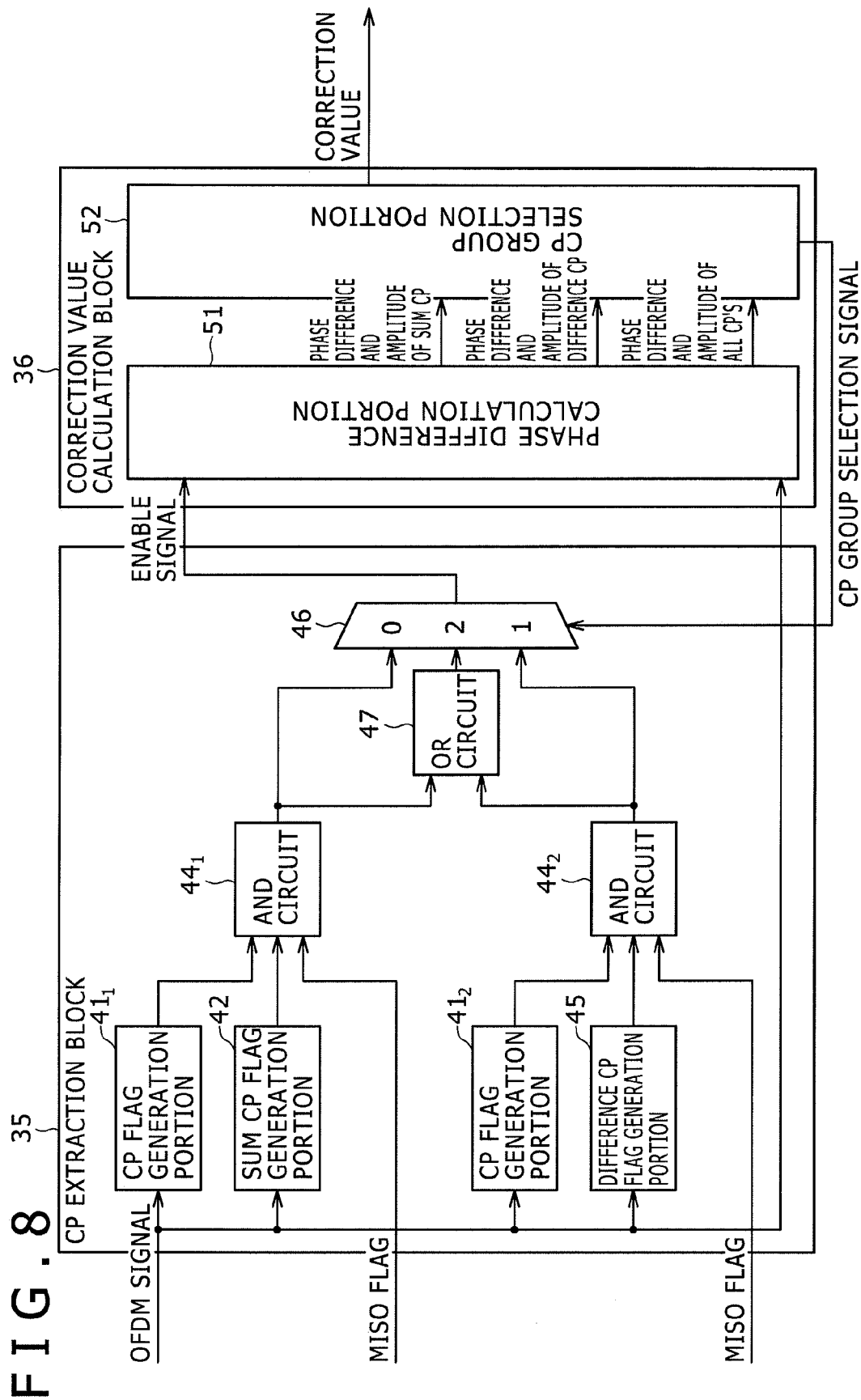

RECEPTION APPARATUS, RECEPTION METHOD, PROGRAM, AND RECEPTION SYSTEM

BACKGROUND OF THE INVENTION

1. Field of the Invention

The present invention relates to a reception apparatus, a reception method, a program, and a reception system. More particularly, the invention relates to a reception apparatus, a reception method, a program, and a reception system for improving the accuracy of the process of demodulating signals transmitted by the MISO scheme.

2. Description of the Related Art

In recent years, the modulation scheme known as Orthogonal Frequency Division Multiplexing (OFDM) has been used as one method by which to transmit digital signals. The OFDM method involves providing numerous orthogonal subcarriers within the transmission band and assigning data to the amplitude and phase of each of the subcarriers for digital modulation based on PSK (Phase Shift Keying) and QAM (Quadrature Amplitude Modulation).

The OFDM method is often used for terrestrial digital broadcasts that are highly vulnerable to multipath interference. The standards that cover terrestrial digital broadcasts adopting the OFDM method illustratively include DVB-T (Digital Video Broadcasting-Terrestrial), ISDB-T (Integrated Services Digital Broadcasting-Terrestrial) and the like.

At present, the ETSI (European Telecommunication Standard Institute) is working on DVB (Digital Video Broadcasting)-T.2 as the next-generation standards that cover terrestrial digital broadcasts (see "DVB Bluebook A122 Rev. 1, Frame structure channel coding and modulation for a second generation digital terrestrial television broadcasting system (DVB-T2); disclosed at the DVB website updated on Sep. 1, 2008 (accessed on Jul. 16, 2009 on the Internet; called the Non-Patent Document 1 hereunder).

SUMMARY OF THE INVENTION

It has been decided that DVB-T.2 will adopt two digital signal transmission and reception systems: SISO (Single Input, Single Output) method and MISO (Multiple Input, Single Output) method. The SISO method is the same as the ordinary scheme allowing signals emitted from a single transmitting antenna to be received by a single antenna. By contrast, the MISO method adopted for the first time by DVB-T.2 is a method permitting signals emitted from two transmitting antennas to be received by a single antenna.

The MISO method thus entails the need for improving the accuracy of demodulation processing.

The present invention has been made in view of the above circumstances and provides a reception apparatus, a reception method, a program, and a reception system for enhancing the accuracy of the process of demodulating signals transmitted by the MISO method.

In carrying out the present invention and according to one embodiment thereof, there is provided a reception apparatus including: acquisition means for acquiring an OFDM signal composed resultingly of signals transmitted by the OFDM method from a plurality of transmission apparatuses; correction value calculation means for calculating a correction value for correcting a drift amount of the OFDM signal using the phase of either a first pilot signal or a second pilot signal extracted from the acquired OFDM signal, the first pilot signal being obtained from pilot signals which are in phase with one another coming from the plurality of transmission apparatuses, the second pilot signal being acquired from pilot signals which are out of phase with one another coming from the plurality of transmission apparatuses; and correction means for correcting the drift amount of the OFDM signal in accordance with the calculated correction value.

Preferably, if the plurality of transmission apparatuses have the same transmission channel status, the correction value calculation means of the above-outlined reception apparatus may calculate the correction value using the phase of the first pilot signal.

Preferably, if the plurality of transmission apparatuses are different from one another in terms of transmission channel status, with the phases of the transmission channels of the transmission apparatuses inverted with respect to one another, then the correction value calculation means of the above-outlined reception apparatus may calculate the correction value using the phase of the second pilot signal.

Preferably, the pilot signals for use with the above-outlined reception apparatus may be CP signals.

According to another embodiment of the present invention, there is provided a reception method including the steps of: causing a reception apparatus to acquire an OFDM signal composed resultingly of signals transmitted by the OFDM method from a plurality of transmission apparatuses; causing the reception apparatus to calculate a correction value for correcting a drift amount of the OFDM signal using the phase of either a first pilot signal or a second pilot signal extracted from the acquired OFDM signal, the first pilot signal being obtained from pilot signals which are in phase with one another coming from the plurality of transmission apparatuses, the second pilot signal being acquired from pilot signals which are out of phase with one another coming from the plurality of transmission apparatuses; and causing the reception apparatus to correct the drift amount of the OFDM signal in accordance with the calculated correction value.

According to a further embodiment of the present invention, there is provided a program including the steps of causing a computer to function as: acquisition means for acquiring an OFDM signal composed resultingly of signals transmitted by the OFDM method from a plurality of transmission apparatuses; correction value calculation means for calculating a correction value for correcting a drift amount of the OFDM signal using the phase of either a first pilot signal or a second pilot signal extracted from the acquired OFDM signal, the first pilot signal being obtained from pilot signals which are in phase with one another coming from the plurality of transmission apparatuses, the second pilot signal being acquired from pilot signals which are out of phase with one another coming from the plurality of transmission apparatuses; and correction means for correcting the drift amount of the OFDM signal in accordance with the calculated correction value.

Where the above-outlined reception apparatus, reception method or program of the embodiments according to the present invention is in use, an OFDM signal composed resultingly of signals transmitted by the OFDM method from a plurality of transmission apparatuses is first acquired. A correction value for correcting a drift amount of the OFDM signal is calculated using the phase of either a first pilot signal or a second pilot signal extracted from the acquired OFDM signal, the first pilot signal being obtained from pilot signals which are in phase with one another coming from the plurality of transmission apparatuses, the second pilot signal being acquired from pilot signals which are out of phase with one another coming from the plurality of transmission apparatuses. The drift amount of the OFDM signal is then corrected in accordance with the calculated correction value.

According to an even further embodiment of the present invention, there is provided a reception apparatus including: acquisition means for acquiring an OFDM signal composed resultingly of signals transmitted by the OFDM method from a plurality of transmission apparatuses; determination means for determining whether a first value and a second value are equal to or larger than a predetermined threshold value, the first value being obtained from a first pilot signal acquired from pilot signals which are in phase with one another extracted from the acquired OFDM signal coming from the plurality of transmission apparatuses, the second value being obtained from a second pilot signal acquired from pilot signals which are out of phase with one another extracted from the acquired OFDM signal coming from the plurality of transmission apparatuses; correction value calculation means for calculating a correction value for correcting a drift amount of the OFDM signal using the phase of the pilot signal from which the value determined to be equal to or larger than the predetermined threshold value has been obtained; and correction means for correcting the drift amount of the OFDM signal in accordance with the calculated correction value.

Preferably, the correction value calculation means may weight the correction value in keeping with either the first value or the second value.

Preferably, the pilot signals may be CP signals.

According to a still further embodiment of the present invention, there is provided a reception method including the steps of: causing a reception apparatus to acquire an OFDM signal composed resultingly of signals transmitted by the OFDM method from a plurality of transmission apparatuses; causing the reception apparatus to determine whether a first value and a second value are equal to or larger than a predetermined threshold value, the first value being obtained from a first pilot signal acquired from pilot signals which are in phase with one another coming from the plurality of transmission apparatuses, the second value being obtained from a second pilot signal acquired from pilot signals which are out of phase with one another coming from the plurality of transmission apparatuses; causing the reception apparatus to calculate a correction value for correcting a drift amount of the OFDM signal using the phase of the pilot signal from which the value determined to be equal to or larger than the predetermined threshold value has been obtained; and causing the reception apparatus to correct the drift amount of the OFDM signal in accordance with the calculated correction value.

According to a yet further embodiment of the present invention, there is provided a program including the steps of causing a computer to function as: acquisition means for acquiring an OFDM signal composed resultingly of signals transmitted by the OFDM method from a plurality of transmission apparatuses; determination means for determining whether a first value and a second value are equal to or larger than a predetermined threshold value, the first value being obtained from a first pilot signal acquired from pilot signals which are in phase with one another extracted from the acquired OFDM signal coming from the plurality of transmission apparatuses, the second value being obtained from a second pilot signal acquired from pilot signals which are out of phase with one another extracted from acquired OFDM signal coming from the plurality of transmission apparatuses; correction value calculation means for calculating a correction value for correcting a drift amount of the OFDM signal using the phase of the pilot signal from which the value determined to be equal to or larger than the predetermined threshold value has been obtained; and correction means for correcting the drift amount of the OFDM signal in accordance with the calculated correction value.

Where the precedingly-outlined reception apparatus, reception method, or program of the embodiments according to the present invention is in use, an OFDM signal composed resultingly of signals transmitted by the OFDM method from a plurality of transmission apparatuses is first acquired. It is then determined whether a first value and a second value are equal to or larger than a predetermined threshold value, the first value being obtained from a first pilot signal acquired from pilot signals which are in phase with one another extracted from the acquired OFDM signal coming from the plurality of transmission apparatuses, the second value being obtained from a second pilot signal acquired from pilot signals which are out of phase with one another extracted from the acquired OFDM signal coming from the plurality of transmission apparatuses. A correction value for correcting a drift amount of the OFDM signal is calculated using the phase of the pilot signal from which the value determined to be equal to or larger than the predetermined threshold value has been obtained. The drift amount of the OFDM signal is then corrected in accordance with the calculated correction value.

According to another embodiment of the present invention, there is provided a reception system including: acquisition means for acquiring signals via a transmission channel; and a transmission channel decode processing section configured to perform a transmission channel decoding process including at least a demodulation process on the signal acquired via the transmission channel; wherein the signal acquired via the transmission channel is an OFDM signal composed resultingly of signals transmitted by the OFDM method from a plurality of transmission apparatuses via the transmission channel; and wherein the transmission channel decode processing section includes: correction value calculation means for calculating a correction value for correcting a drift amount of the OFDM signal using the phase of either a first pilot signal or a second pilot signal extracted from the acquired OFDM signal, the first pilot signal being obtained from pilot signals which are in phase with one another coming from the plurality of transmission apparatuses, the second pilot signal being acquired from pilot signals which are out of phase with one another coming from the plurality of transmission apparatuses; and correction means for correcting the drift amount of the OFDM signal in accordance with the calculated correction value.

According to a further embodiment of the present invention, there is provided a reception system including: a transmission channel decode processing section configured to perform a transmission channel decoding process including at least a demodulation process on a signal acquired via a transmission channel; and an information source decode processing section configured to perform an information source decoding process on the signal having undergone the transmission channel decoding process, the information source decoding process including at least the process of expanding compressed signal into the original information; wherein the signal acquired via the transmission channel is an OFDM signal composed resultingly of signals transmitted by the OFDM method from a plurality of transmission apparatuses via the transmission channel; and wherein the transmission channel decode processing section includes: correction value calculation means for calculating a correction value for correcting a drift amount of the OFDM signal using the phase of either a first pilot signal or a second pilot signal extracted from the acquired OFDM signal, the first pilot signal being obtained from pilot signals which are in phase with one another coming from the plurality of transmission apparatuses, the second pilot signal being acquired from pilot signals which are out of phase with one another coming from the plurality of transmission apparatuses; and correction means for correcting the drift amount of the OFDM signal in accordance with the calculated correction value.

According to an even further embodiment of the present invention, there is provided a reception system including: a transmission channel decode processing section configured to perform a transmission channel decoding process including at least a demodulation process on a signal acquired via a transmission channel; and an output section configured to output images or sounds based on the signal having undergone the transmission channel decoding process; wherein the signal acquired via the transmission channel is an OFDM signal composed resultingly of signals transmitted by the OFDM method from a plurality of transmission apparatuses via the plurality of transmission channels; and wherein the transmission channel decode processing section includes: correction value calculation means for calculating a correction value for correcting a drift amount of the OFDM signal using the phase of either a first pilot signal or a second pilot signal extracted from the acquired OFDM signal, the first pilot signal being obtained from pilot signals which are in phase with one another coming from the plurality of transmission apparatuses, the second pilot signal being acquired from pilot signals which are out of phase with one another coming from the plurality of transmission apparatuses; and correction means for correcting the drift amount of the OFDM signal in accordance with the calculated correction value.

According to a still further embodiment of the present invention, there is provided a reception system including: a transmission channel decode processing section configured to perform a transmission channel decoding process including at least a demodulation process on a signal acquired via a transmission channel; and a recording section configured to record the signal having undergone the transmission channel decoding process; wherein the signal acquired via the transmission channel is an OFDM signal composed resultingly of signals transmitted by the OFDM method from a plurality of transmission apparatuses via the plurality of transmission channels; and wherein the transmission channel decode processing section includes: correction value calculation means for calculating a correction value for correcting a drift amount of the OFDM signal using the phase of either a first pilot signal or a second pilot signal extracted from the acquired OFDM signal, the first pilot signal being obtained from pilot signals which are in phase with one another coming from the plurality of transmission apparatuses, the second pilot signal being acquired from pilot signals which are out of phase with one another coming from the plurality of transmission apparatuses; and correction means for correcting the drift amount of the OFDM signal in accordance with the calculated correction value.

Where one of the above-outlined reception systems of the embodiments of the present invention is in use, a correction value for correcting a drift amount of the OFDM signal is calculated using the phase of either a first pilot signal or a second pilot signal extracted from the acquired OFDM signal, the first pilot signal being obtained from pilot signals which are in phase with one another coming from the plurality of transmission apparatuses, the second pilot signal being acquired from pilot signals which are out of phase with one another coming from the plurality of transmission apparatuses. The drift amount of the OFDM signal is then corrected in accordance with the calculated correction value.

The reception apparatus may be either an independent apparatus, or an internal block or blocks constituting part of a single apparatus.

The program may be offered either transmitted via transmission media or recorded on recording media.

According to the present invention embodied as outlined above, it is possible to enhance the accuracy of the process of demodulating signals transmitted by the MISO method.

BRIEF DESCRIPTION OF THE DRAWINGS

Further features and advantages of the present invention will become apparent upon a reading of the following description and appended drawings in which:

FIG. 8 is a block diagram showing a typical structure of a third embodiment of the demodulation unit indicated in FIG. 2;

DETAILED DESCRIPTION OF THE PREFERRED EMBODIMENTS

Some preferred embodiments of the present invention will now be described in reference to the accompanying drawings.

[Typical Structure of the Reception Apparatus]

Figure 1:
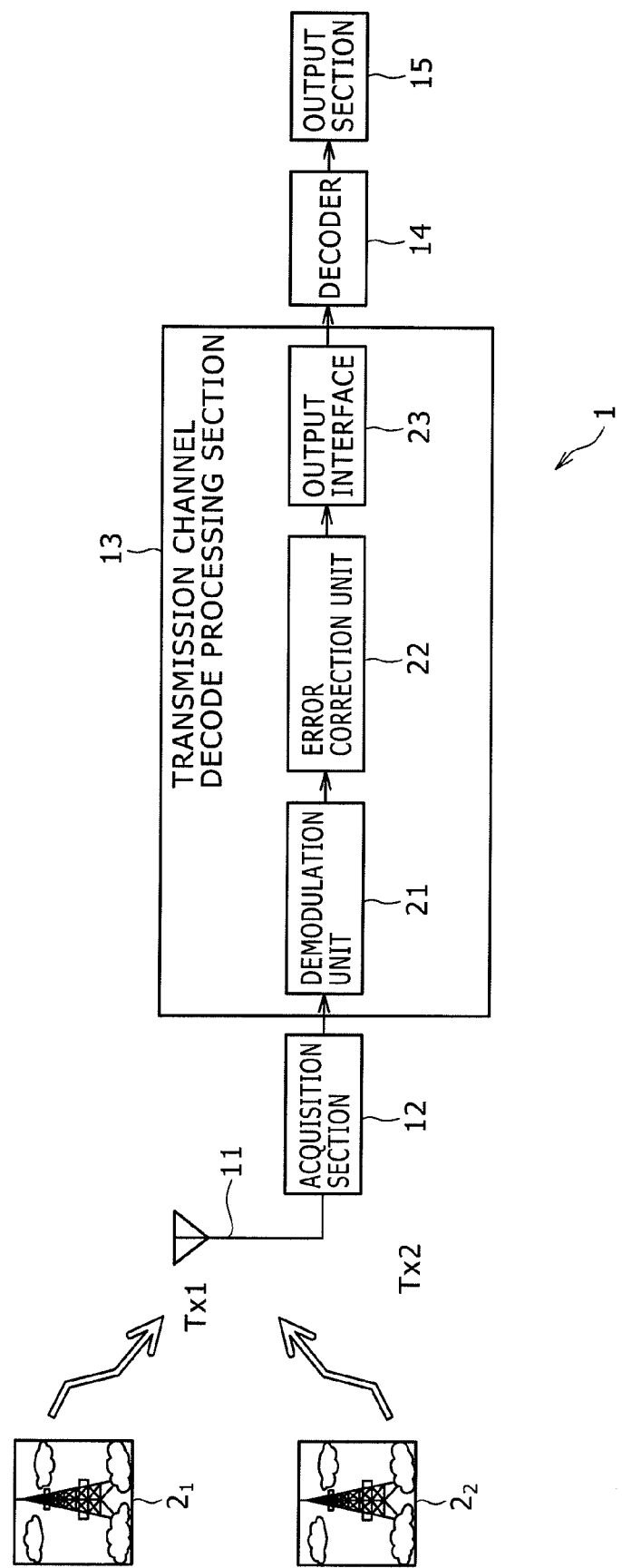
FIG. 1 is a block diagram showing a typical structure of a reception apparatus to which an embodiment of the present invention is applied.

FIG. 1 is a block diagram showing a typical structure of a reception apparatus 1 to which an embodiment of the present invention is applied.

The reception apparatus 1 in FIG. 1 receives digital broadcast signals transmitted by the MISO method that is adopted by DVB-T.2 being worked out as a standard for next-generation terrestrial digital broadcasting.

Illustratively, two transmission apparatuses $2_1$ and $2_2$ such as broadcasting stations (also identified by their transmission channels Tx1 and Tx2 hereunder) transmit OFDM signals of digital broadcasts over transmission channels using the MISO method. The reception apparatus 1 receives as a single OFDM signal the OFDM signals sent from the transmission apparatuses $2_1$ and $2_2$. The reception apparatus 1 performs a transmission channel decoding process including a demodulation process and an error correction process on the OFDM signal, and outputs the decoded data resulting from the processes to the downstream stage.

That is, the OFDM signals transmitted separately over two transmission channels are received by a single antenna 11 of the reception apparatus 1 and composed thereby into one OFDM signal as a result.

In the typical structure of FIG. 1, the reception apparatus 1 is made up of the antenna 11, an acquisition section 12, a transmission channel decode processing section 13, a decoder 14, and an output section 15.

The antenna 11 receives as one OFDM signal the OFDM signals transmitted by the transmission apparatuses $2_1$ and $2_2$ over their transmission channels, and feeds the received single OFDM signal to the acquisition section 12.

The acquisition section 12 is typically constituted by a tuner or a set-top box (STB). The acquisition section 12 frequency-converts the OFDM signal (RF signal) received through the antenna 11 into an IF (intermediate frequency) signal, and sends the IF signal to the transmission channel decode processing section 13.

The transmission channel decode processing section 13 performs necessary processes such as demodulation and error correction on the signal coming from the acquisition section 12. Through these processes, the transmission channel decode processing section 13 illustratively obtains TS (transport stream) packets and supplies the acquired TS packets to the decoder 14.

The transmission channel decode processing section 13 is made up of a demodulation unit 21, an error correction unit 22, and an output interface 23.

The demodulation unit 21 performs a demodulation process on the signal coming from the acquisition section 12, and forwards the resulting demodulated signal to the error correction unit 22.

The demodulation unit 21 performs its demodulation processing using illustratively pilot signals extracted from the signal coming from the acquisition section 12. The demodulation process typically includes transmission channel estimation, channel estimation, and phase estimation.

Incidentally, the pilot signals include CP (continual pilot) signals inserted per symbol and SP (scattered pilot) signals inserted at predetermined time intervals. The pilot signals are known signals modulated by known modulation methods such as BPSK (Binary Phase Shift Keying). The same pilot signals are transmitted on the same carrier.

The pilot signals include sum pilot signals and difference pilot signals. The sum pilot signal is a signal indicating that the phases of the transmission channels Tx1 and Tx2 are not inverted with respect to each other. The difference pilot signal is a signal indicating that the phases of the transmission channels Tx1 and Tx2 are inverted with respect to each other.

The error correction unit 22 performs a predetermined error correction process on the demodulated signal obtained from the demodulation unit 21. The TS packets resulting from the process are output to the output interface 23.

The transmission apparatuses $2_1$ and $2_2$ encode the data constituting their programs formed by images and sounds using the MPEG (Moving Picture Experts Group) standard. The transport streams made up of the TS packets containing the MPEG-encoded data are transmitted as the OFDM signals.

Also, the transmission apparatuses $2_1$ and $2_2$ encode their transport streams into, for example, RS (Reed Solomon) codes or LDPC (Low Density Parity Check) codes as a countermeasure against errors that may occur on the transmission channels. For this reason, the error correction unit 22 decodes the encoded data as part of its error-correcting code processing.

The output interface 23 performs an output process for outputting the TS packets making up the transport stream from the error correction unit 22 to the outside at a predetermined constant rate. In carrying out its output process, the output interface 23 supplies the TS packets to the decoder 14.

Using the MPEG standard, the decoder 14 decodes the encoded data contained in the TS packets coming from the output interface 23 using the MPEG standard. The decoder 14 feeds the resulting video and audio data to the output section 15.

The output section 15 is illustratively made up of a display and speakers. Given the video and audio data from the decoder 14, the output section 15 displays images and outputs sounds accordingly.

The reception apparatus 1 is thus constituted by the above-described components.

[Typical Structure of the Demodulation Unit]

Figure 2:
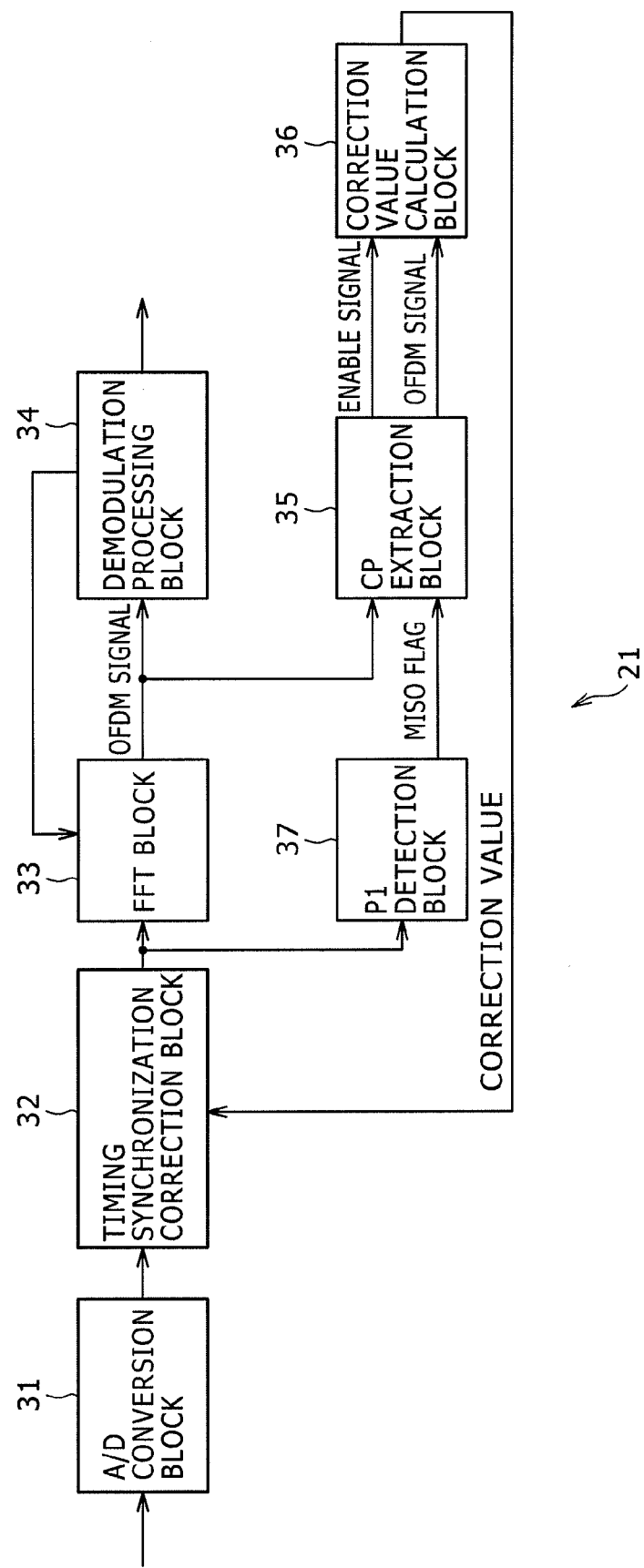
FIG. 2 is a block diagram showing a typical structure of a demodulation unit included in FIG. 1.

FIG. 2 shows a typical structure of the demodulation unit 21 shown in FIG. 1.

In the typical structure of FIG. 2, the demodulation unit 21 is made up of an A/D (analog/digital) conversion block 31, a timing synchronization correction block 32, an FFT (Fast Fourier Transformation) block 33, a demodulation processing block 34, a CP extraction block 35, a correction value calculation block 36, and a P1 detection block 37.

The A/D conversion block 31 subjects the signal coming from the acquisition section 12 to A/D conversion. The resulting OFDM signal in digital form is forwarded from the A/D conversion block 31 to the timing synchronization correction block 32.

The timing synchronization correction block 32 corrects the OFDM signal from the A/D conversion block 31 in keeping with the correction value supplied from the correction value calculation block 36, to be discussed later. The OFDM signal thus corrected is sent from the timing synchronization correction block 32 to the FFT block 33 and P1 detection block 37.

Based on instructions about a trigger position from the demodulation processing block 34, the FFT block 33 performs FFT operations on the corrected OFDM signal from the timing synchronization correction block 32 over a predetermined data segment. The FFT block 33 feeds the OFDM signal acquired through the FFT operations to the demodulation processing block 34 and CP extraction block 35.

The demodulation processing block 34 performs temporal interpolation of the SP signals extracted from the OFDM signal having undergone the FFT operations, and effects inverse Fast Fourier transformation of the SP signals following the temporal interpolation, thereby estimating the transmission channel characteristics per symbol. As a result, the characteristics of two transmission channels for each specific carrier are estimated in the direction of frequencies regarding all symbols, whereby transmission channel profiles denoting the characteristics of the two transmission channels are obtained. From the transmission channel profiles thus acquired, the demodulation processing block 34 calculates an optimal trigger position for FFT operations. Information about the calculated trigger position for FFT operations is sent to the FFT block 33.

In keeping with the optimal center position of a frequency interpolation filter obtained from the SP signals subsequent to the temporal interpolation, the demodulation processing block 34 shifts (i.e., rotates) the position of the frequency interpolation filter in order to perform the frequency interpolation process on the temporally interpolated SP signals. This allows the demodulation processing block 34 to effect interpolation in the frequency direction. Using the SP signals following the frequency interpolation, the demodulation processing block 34 obtains channel estimates representative of impulse responses (transmission channel characteristics) over the transmission channel frequency range. By performing predetermined operations on these channel estimates, the demodulation processing block 34 equalizes the signals transmitted from the transmission apparatuses $2_1$ and $2_2$ and feeds the equalized signals to the error correction unit 22.

The P1 detection block 37 detects P1 symbols from the OFDM signal fed from the timing synchronization correction block 32 and demodulates the detected P1 symbols into information which is acquired to denote the SISO or MISO method in use. On detecting the information about the transmission/reception method in effect, the P1 detection block 37 generates a flag (called the MISO flag hereunder) reflecting the acquired information, and sends the generated flag to the CP extraction block 35.

Based primarily on the MISO flag fed from the P1 detection block 37 or the like, the CP extraction block 35 performs the process of extracting CP signals from the OFDM signal that came from the FFT block 33 after undergoing the FFT operations. Upon extracting a CP signal from the OFDM signal, the CP extraction block 35 feeds an enable signal to the correction value calculation block 36 in a manner synchronous with the target OFDM signal.

When supplied with the enable signal in synchronism with the OFDM signal sent from the CP extraction block 35, the correction value calculation block 36 obtains a phase difference of the CP signal (with respect to a known signal) because the OFDM signal has become the CP signal. The correction value calculation block 36 then calculates a correction value of the OFDM signal that will eliminate the phase difference of the CP signal, and feeds the calculated correction value to the timing synchronization correction block 32.

That is, the CP signals constitute complex vectors having a known amplitude and phase each, and are arrayed at predetermined intervals. Between CP signals is a carrier for data or the like to be transmitted. With the reception apparatus 1, the CP signals are acquired in a distorted manner under the influence of transmission channel characteristics. The phase is estimated by comparing the received CP signal with the known CP signal that has been transmitted.

In the manner described above, the timing synchronization correction block 32 effects feedback control over the correction of the OFDM signal from the A/D conversion block 31 in accordance with the correction value supplied from the correction value calculation block 36.

The example shown in FIG. 2 constitutes the structure wherein the correction value calculated by the correction value calculation block 36 is sent to the timing synchronization correction block 32. However, this structure is not limitative of the present invention. Alternatively, there may be provided a structure in which the correction value is fed to another correction circuit (not shown) that will perform the correction process using the supplied correction value.

The demodulation unit 21 is thus constituted by the above-described components.

Typical Structure of the First Embodiment of the Demodulation Unit

A typical structure of the first embodiment of the demodulation unit 21 shown in FIG. 2 is explained below in reference to FIGS. 3 through 5B.

Figure 3:
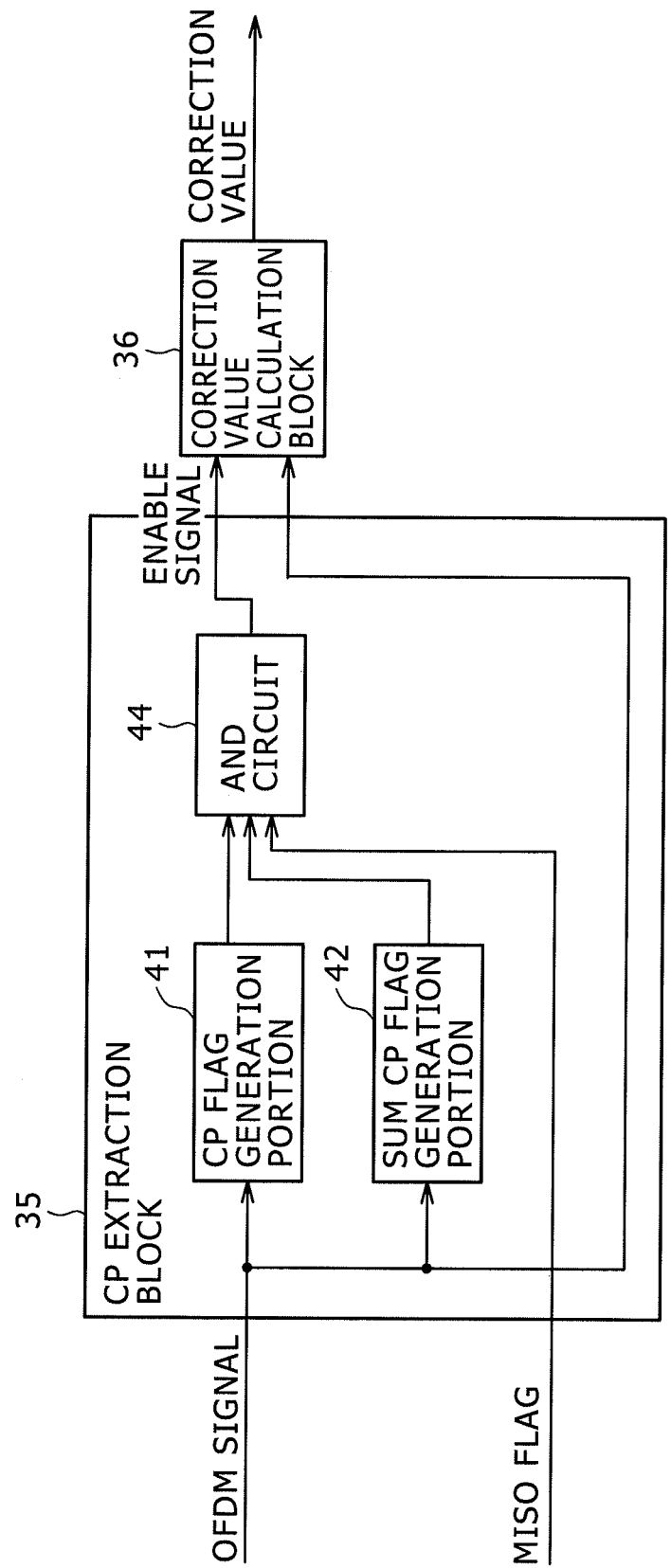
FIG. 3 is a block diagram showing a typical structure of a first embodiment of the demodulation unit indicated in FIG. 2.

FIG. 3 shows how the CP extraction block 35 and correction value calculation block 36 are typically structured to constitute the first embodiment of the demodulation unit 21 in FIG. 2.

In the typical structure of FIG. 3, the CP extraction block 35 is made up of a CP flag generation portion 41, a sum CP flag generation portion 42, and an AND circuit 44.

The CP flag generation portion 41 and sum CP flag generation portion 42 are each supplied with the corrected OFDM signal from the timing synchronization correction block 32.

The CP flag generation portion 41 performs the process of extracting CP signals from the OFDM signal fed from the timing synchronization correction block 32. The CP flag generation portion 41 generates a flag (called the CP flag hereunder) representative of the result of the CP signal detection, and sends the generated flag to the AND circuit 44.

From the OFDM signal supplied from the timing synchronization correction block 32, the sum CP flag generation portion 42 performs the process of detecting a sum pilot signal out of the CP signals involved. The sum CP flag generation portion 42 generates a flag (called the sum CP flag hereunder) representative of the result of the sum CP signal detection, and sends the generated flag to the AND circuit 44.

The AND circuit 44 is supplied with the CP flag from the CP flag generation portion 41, the sum CP flag from the sum CP flag generation portion 42, and the MISO flag from the P1 detection block 37 in FIG. 2. The AND circuit 44 AND's the supplied flags. If the CP signal detected from the OFDM signal is a sum pilot signal and if the transmission/reception method in effect is found to be the MISO method, then the AND circuit 44 supplies the correction value calculation block 36 with an enable signal in synchronism with the target OFDM signal.

The enable signal from the CP extraction block 35 and the OFDM signal are input to the correction value calculation block 36. When the enable signal is input to the correction value calculation block 36 in synchronism with the OFDM signal, that OFDM signal becomes a sum pilot signal for the CP signal. In that case, the correction value calculation block 36 obtains the phase difference of the sum pilot signal. The correction value calculation block 36 proceeds to supply the timing synchronization correction block 32 with the correction value corresponding to the calculated phase.

What follows is a more detailed explanation of the CP signals used to obtain the correction value of the OFDM signal.

Figure 4:
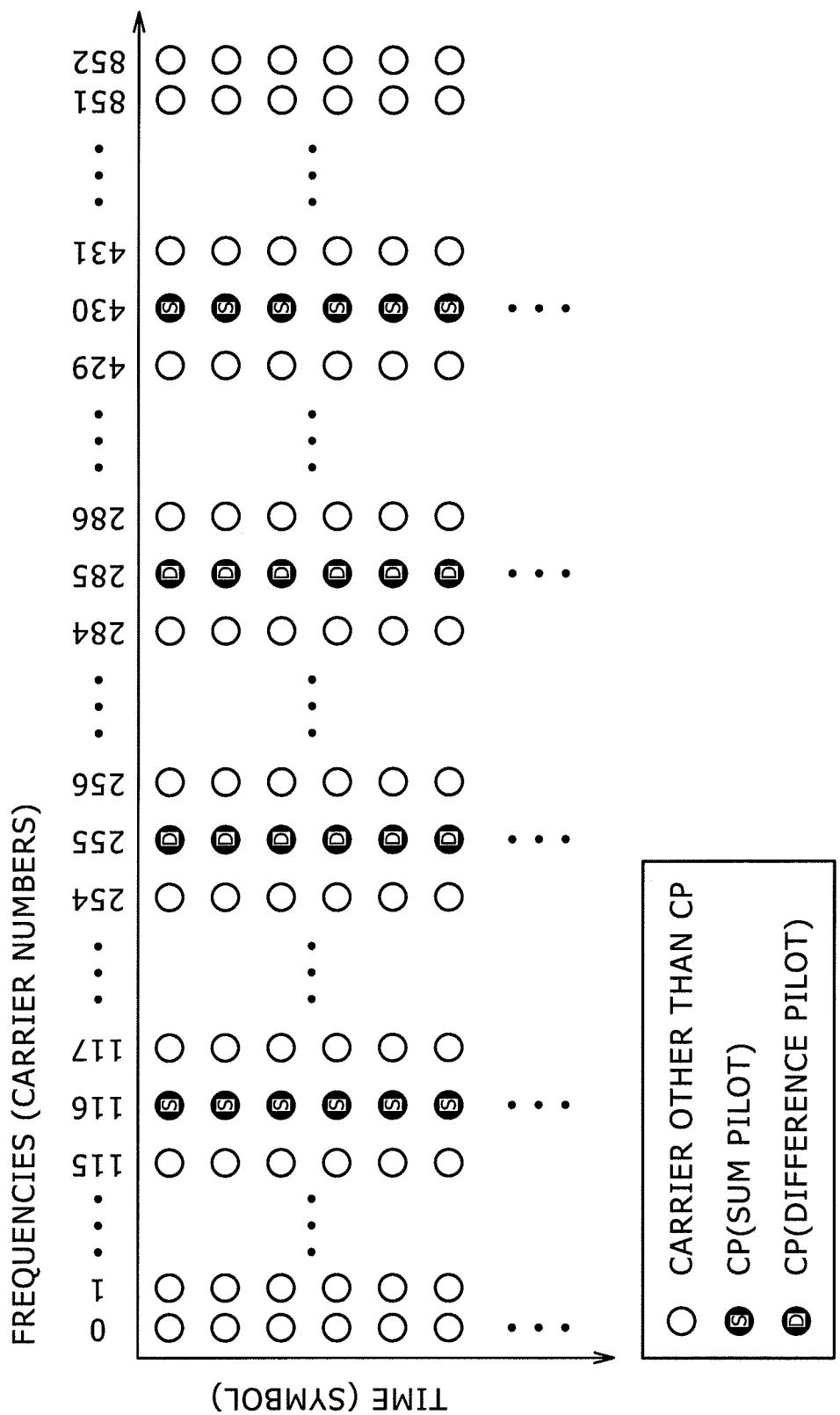
FIG. 4 is a schematic view showing a typical array pattern of CP signals within OFDM symbols according to the MISO method.

FIG. 4 schematically shows a typical array pattern of CP signals (sum pilot signals and difference pilot signals) within OFDM symbols according to the MISO method. In FIG. 4, the horizontal axis stands for carriers of the OFDM signal and the vertical axis denotes OFDM symbols of the OFDM signal. The numbers given along the horizontal axis represent the carrier numbers of the carriers indicated by circles. Each symbol is assigned a symbol number, not shown. The carriers correspond to frequencies and the symbols correspond to points in time.

Also in FIG. 4, each circle represents a single OFDM symbol. Solid-filled circles each with a character "S" inside denote sum pilot signals, and solid-filled circles each with a character "D" inside stand for difference pilot signals.

FIG. 4 shows a typical array pattern of CP signals in effect when the FFT size is "1K" and the pilot pattern is "PP1." In this case, as indicated by the OFDM symbols of the solid-filled circles, the OFDM signals with carrier numbers k=116, 255, 285, 430, etc., become CP signals. Of these CP signals, those with carrier numbers k=116, 430, etc., are sum pilot signals; the CP signals with carrier numbers k=255, 285, etc., are difference pilot signals.

More specifically, as described in the above-cited Non-Patent Document 1 (pp. 146 to 150, Annex G (normative): Locations of the continual pilots, table G.1), the carrier numbers of CP signals based on the DVB-T2 standard are acquired from the pilot pattern and the FFT size. In the above example, the parameters are "PP1" and "1K" (kmax=852), so that nine carriers with carrier numbers k=116, 255, 285, 430, 518, 546, 601, 646, and 744 turn out to be CP signals.

Of the CP signals above, those not overlapping with SP signals become sum pilot signals and those overlapping with the SP signals become difference pilot signals. It is thus possible to obtain the sum pilot signals and difference pilot signals of the CP signals from the quotients acquired by dividing the carrier numbers "k" of the carriers becoming CP signals by the pilot carrier interval $D_x$ of the SP signals.

If the remainder "r" from the division of "k" by $D_x$ is defined as r=k mod $D_x$, then the remainders "r" for k=116, 255, 285, 430, 518, 546, 601, 646, and 744 are given as shown below. It should be noted that as described in the above-cited Non-Patent Document 1 (pp. 95, 9.2.3.1 Locations of the scattered pilots, table 51), the pilot carrier interval $D_x$ under the DVB-T2 standard becomes $D_x$=3 when the pilot pattern is "PP1."

116 mod 3=2
255 mod 3=0
285 mod 3=0
430 mod 3=1
518 mod 3=2
546 mod 3=0
601 mod 3=1
646 mod 3=1
744 mod 3=0

That is, when k=116, 430, 518, 601, and 646, the remainder "r" is other than 0 (k mod $D_x$ !=0), which means the carrier numbers cannot be divided by the pilot carrier interval. In that case, these CP signals become sum pilot signals. On the other hand, when k=255, 285, 546, and 744, the remainder "r" is zero (k mod $D_x$=0), which means the carrier numbers can be divided by the pilot carrier interval. In this case, these CP signals become difference pilot signals.

In the manner described above, the CP signals can be distinguished into sum pilot signals and difference pilot signals in accordance with the FFT size and the pilot pattern.

Figure 5A:
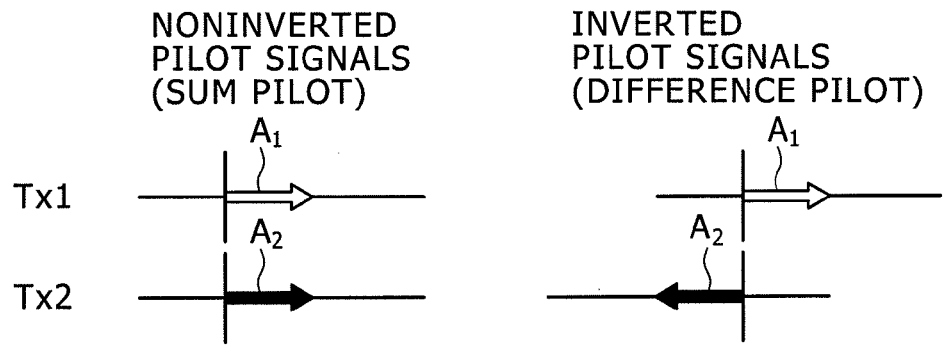
FIGS. 5A and 5B are schematic views showing relations between a sum pilot signal and a difference pilot signal.

As shown in FIG. 5A, the transmission apparatuses $2_1$ and $2_2$ on the transmitting side send out over transmission channels two kinds of pilot signals: sum pilot signals which are not inverted, and difference pilot signals which are inverted. On the receiving side, the reception apparatus 1 cannot obtain an appropriate correction value if the phase difference of difference pilot signals is zero. This is because the reception apparatus 1 uses the phase of CP signals in calculating the correction value as discussed above. When the appropriate correction value is not acquired, the accuracy of the correction process performed by the correction circuit such as the timing synchronization correction block 32 is lowered. As a result, problems can occur such as delays in timing synchronization and an inability to acquire timing synchronization.

Figure 5B:
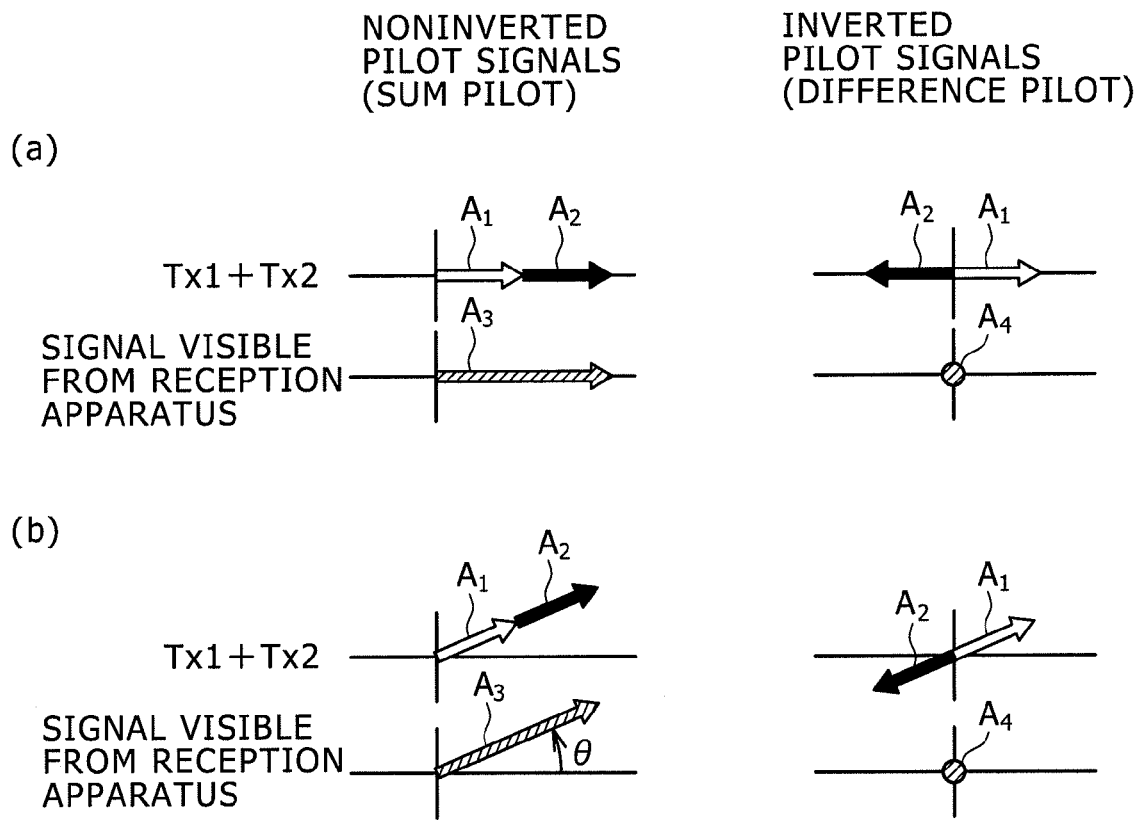

More specifically, the left side of subfigure (a) in FIG. 5B shows that an arrow $A_1$ indicating the CP signal on the transmission channel Tx1 has the same size and the same direction as an arrow $A_2$ denoting the CP signal on the transmission channel Tx2 inside the reception apparatus 1 handling sum pilot signal of which the phase is not rotated on the receiving side. As a result, the actual signal acquired by the reception apparatus 1 has the size and direction indicated by an arrow $A_3$ composed of the two arrows. In this case, the reception apparatus 1 can extract the sum pilot signals and is therefore capable of estimating the phase.

On the other hand, the right side of subfigure (a) in FIG. 5B shows that the arrow $A_1$ has the same size as the arrow $A_2$ but their directions are opposite inside the reception apparatus 1 handling difference pilot signals of which the phase is not rotated. The two arrows, when composed, thus cancel each other so that the actual signal acquired by the reception apparatus 1 is one indicated by a circle $A_4$ having neither size nor direction. In this case, the reception apparatus 1 cannot extract difference pilot signals and therefore has difficulty in estimating a highly accurate phase because the phase occurs at random.

Also, subfigure (b) in FIG. 5B shows the case in which the phase is rotated. Here, as with the case of subfigure (a) in FIG. 5B, if the CP signals are sum pilot signals, it is possible to estimate the phase; if the CP signals are difference pilot signals, it is difficult to estimate the phase in a highly accurate manner.

Thus with the first embodiment, as shown in FIG. 3, the CP extraction block 35 outputs the enable signal to the correction value calculation block 36 if the detected CP signal is a sum pilot signal and if the transmission/reception method in effect is the MISO method. Upon input of the enable signal in synchronism with the OFDM signal, the correction value calculation block 36 outputs the correction value corresponding to the phase of the sum pilot signal in question. In this manner, the demodulation unit 21 in FIG. 2 performs phase estimation using solely sum pilot signals.

Illustratively, if the transmission channel from the transmission apparatus $2_1$ to the reception apparatus 1 is the same in status as the transmission channel from the transmission apparatus $2_2$ to the reception apparatus 1 as shown in FIGS. 5A and 5B, there is no possibility of the phases of the transmission channels Tx1 and Tx2 getting rotated. This makes it possible to estimate the phase using solely the sum pilot signals of the first embodiment (e.g., k=116, 430, 518, 601, 646 in FIG. 4).

As described above, the first embodiment can estimate the phase with high accuracy by obtaining a phase difference using only the sum pilot signals (sum CP), without recourse to the difference pilot signals that may well hamper highly accurate phase estimation. Because the correction value reflecting the estimated phase can be output to the correction circuit such as the timing synchronization correction block 32, it is possible to enhance the accuracy of the demodulation process performed on the signals output according to the MISO method.

Typical Structure of the Second Embodiment of the Demodulation Unit

A typical structure of the second embodiment of the demodulation unit 21 shown in FIG. 2 is explained below in reference to FIGS. 6 through 7C.

Figure 6:
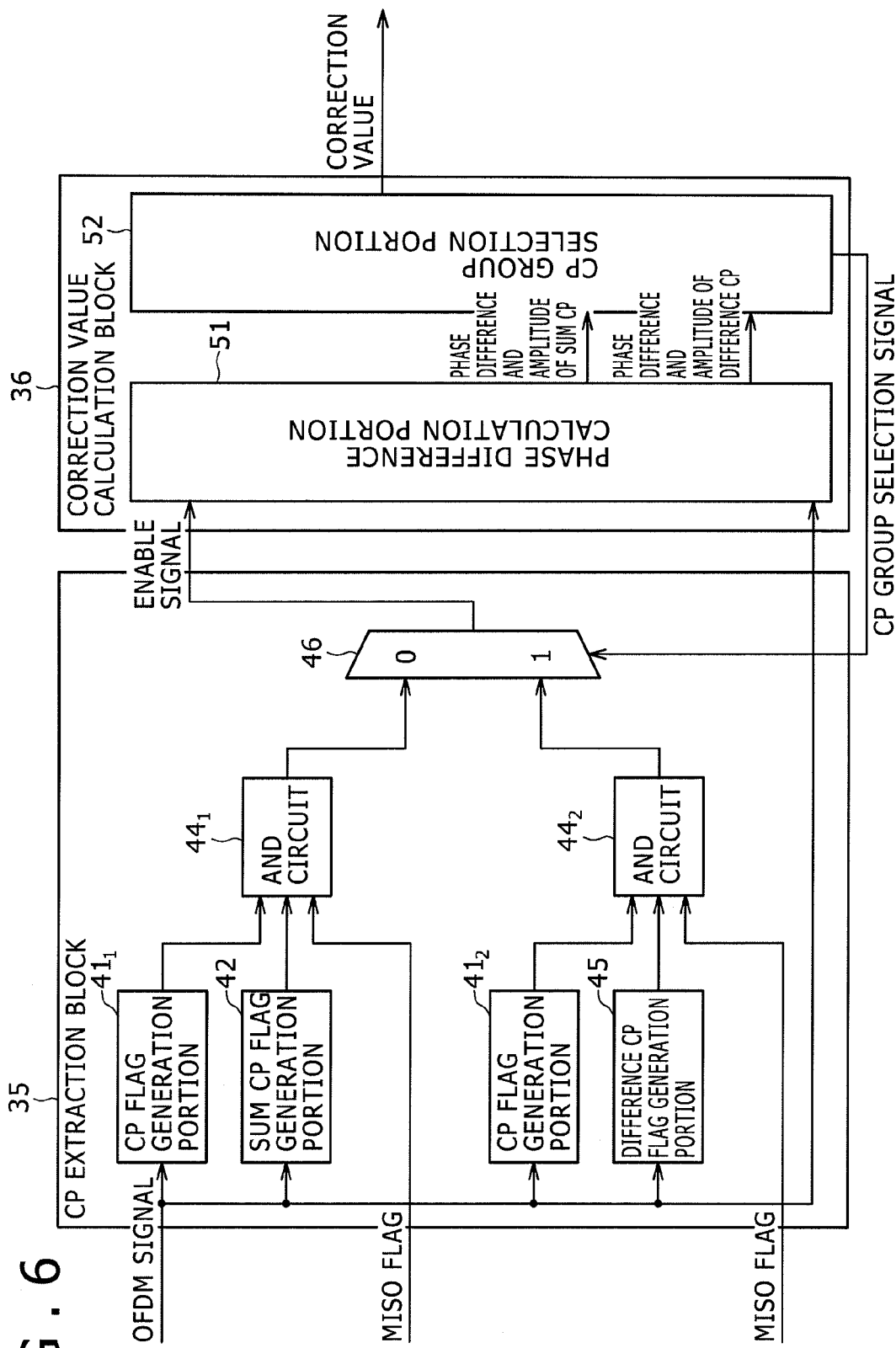
FIG. 6 is a block diagram showing a typical structure of a second embodiment of the demodulation unit indicated in FIG. 2.

FIG. 6 shows how the CP extraction block 35 and correction value calculation block 36 are typically structured to constitute the second embodiment of the demodulation unit 21 in FIG. 2.

Of the reference numerals in FIG. 6, those already used in FIG. 3 designate like or corresponding parts, and the descriptions of these parts may be omitted where redundant.

In the typical structure of FIG. 6, the CP extraction block 35 is made up of CP flag generation portions $41_1$ and $41_2$, a sum CP flag generation portion 42, AND circuits 44₁ and 44₂, a difference CP flag generation portion 45, and a selector 46.

That is, when the transmission/reception method in effect is the MISO method, the CP extraction block 35 in FIG. 6 is common to its counterpart in FIG. 3 in that it includes the CP flag generation portion 41 (41₁), sum CP flag generation portion 42, and AND circuit 44 (44₁) for detecting the CP signals that will become sum pilot signals (sum CP). It should be noted that a predetermined signal (called the sum CP detection signal hereunder) output from the AND circuit 44 (44₁) is directed not to the correction value calculation block 36 but to the selector 46.

On the other hand, where the transmission/reception method in effect is the MISO method, the CP extraction block 35 in FIG. 6 is different from its counterpart in FIG. 3 in that besides the selector 46, there are provided the CP flag generation portion 41₂, difference CP flag generation portion 45, and AND circuit 44₂ for detecting the CP signals that will become difference pilot signals (difference CP).

In the example of FIG. 6, as with the CP flag generation portion 41 (41₁) in FIG. 3, the CP flag generation portion 41₂ generates the CP flag reflecting the result of CP signal detection. The CP flag thus generated is supplied to the AND circuit 44₂.

The difference CP flag generation portion 45 performs the process of detecting difference pilot signals from among the CP signals out of the OFDM signal fed from the timing synchronization correction block 32. The difference CP flag generation portion 45 thus generates the flag (called the difference CP flag hereunder) reflecting the result of difference pilot signal detection. The generated flag is sent to the AND circuit 44₂.

The AND circuit 44₂ is supplied with the CP flag from the CP flag generation portion 41₂, the difference CP flag from the difference CP flag generation portion 45, and the MISO flag from the P1 detection block 37 in FIG. 2. The AND circuit 44₂ AND's the supplied flags. If the CP signal detected from the OFDM signal is a difference pilot signal and if the transmission/reception method in effect is found to be the MISO method, then the AND circuit 44₂ sends a predetermined signal (called the difference CP detection signal hereunder) to the selector 46.

In addition to the signals coming from the AND circuits 44₁ and 44₂, the selector 46 is supplied with a CP group selection signal from a CP group selection portion 52, to be discussed later. The CP group selection signal is a signal that causes the selector 46 to output an enable signal in synchronism with the input of either the sum CP detection signal or the difference CP detection signal. The timing for outputting the enable signal may be established as desired by the user.

For example, if "0" is input and established as the CP group selection signal, the selector 46 feeds the enable signal to the correction value calculation block 36 only upon input of the sum CP detection signal from the AND circuit 44₁. On the other hand, if "1" is input and established as the CP group selection signal, the selector 46 supplies the enable signal to the correction value calculation block 36 only upon input of the difference CP detection signal from the AND circuit 44₂.

The correction value calculation block 36 is made up of a phase difference calculation portion 51 and a CP group selection portion 52.

The enable signal from the selector 46 and the OFDM signal from the CP extraction block 35 are input to the phase difference calculation portion 51. Upon input of the enable signal in synchronism with the OFDM signal which becomes a CP signal, the phase difference calculation portion 51 obtains the phase difference and amplitude value of the CP signal and supplies the CP group selection portion 52 therewith. That is, upon input of a sum pilot signal, the phase difference calculation portion 51 provides the phase difference and amplitude value of the sum pilot signal (sum CP) in question. Upon input of a difference pilot signal, the phase difference calculation portion 51 provides the phase difference and amplitude value of that difference pilot signal (difference CP).

The CP group selection portion 52 obtains the correction value corresponding to the phase calculated by the phase difference calculation portion 51. The correction value thus acquired is sent to the timing synchronization correction block 32.

Also, the CP group selection portion 52 determines which of the sum pilot signal and the difference pilot signal is better suited for estimating the phase, and supplies the selector 46 with a CP group selection signal reflecting the result of the determination. That is, when the CP group selection portion 52 controls the CP group selection signal, the output from the phase difference calculation portion 51 is classified into either the sum CP group or the difference CP group.

For example, if the CP group selection portion 52 feeds the CP group selection signal composed of "0" to the selector 46 so as to establish the sum pilot (sum CP) CP group, the phase difference calculation portion 51 is supplied with the enable signal from the selector 46 in synchronism with the sum CP detection signal from the AND circuit 44₁. This causes the phase difference calculation portion 51 to supply the phase difference and amplitude value of the sum pilot signal (sum CP) to the CP group selection portion 52. In turn, the CP group selection portion 52 outputs the correction value reflecting the phase. At this point, the CP group selection portion 52 determines whether a value (power value) obtained from the sum pilot signal (sum CP), typically from the amplitude value thereof, is at least equal to a predetermined threshold value.

If the power value is determined to be equal to or larger than the predetermined threshold value, that means a sufficient amplitude value is being obtained, so that the CP group selection portion 52 does not change the CP group and maintains the current status. On the other hand, if the power value is determined to be lower than the predetermined threshold value, that means the sufficient amplitude value is not being obtained and that a highly accurate phase is difficult to estimate. In this case, the CP group selection portion 52 outputs the CP group selection signal composed of "1" to the selector 46 in order to change the CP group.

In turn, within the CP extraction block 35, the enable signal from the selector 46 is sent to the phase difference calculation portion 51 in synchronism with the difference CP detection signal coming from the AND circuit 44₂. As a result, the CP group selection portion 52 is supplied with the phase difference and amplitude value of the difference pilot signal (difference CP). The CP group selection portion 52 in turn outputs the correction value reflecting the phase.

That is, in the example of FIG. 6, if the accuracy of the phase obtained from the sum pilot signal (sum CP) is lowered, then the phase acquired from the difference pilot signal (difference CP) can be used to calculate the correction value.

Figure 7A:
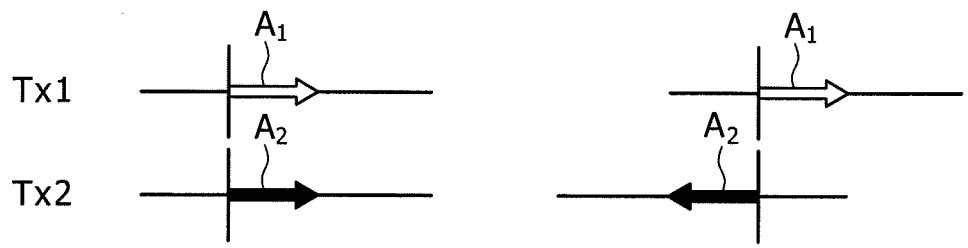
FIGS. 7A, 7B and 7C are schematic views showing relations between the sum pilot signal and the difference pilot signal.
Figure 7B:
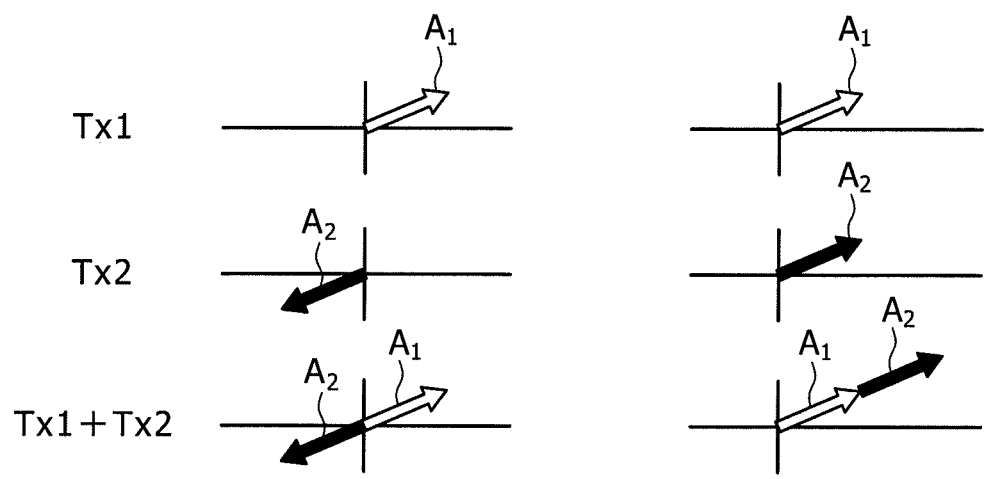
Figure 7C:
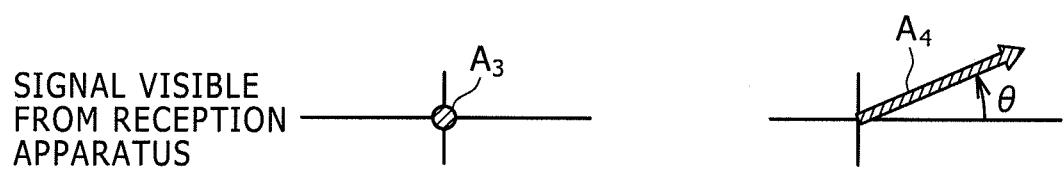

Illustratively, if the transmission channels Tx1 and Tx2 are different from each other in status, the phase of one channel may well be rotated 180 degrees with respect to the phase of the other channel, as shown in FIGS. 7A through 7C.

In the example of FIG. 7A, the transmission apparatuses 2₁ and 2₂ on the transmitting side send out sum pilot signals and difference pilot signals. In the example of FIG. 7B, the phase of the transmission channel Tx1 is shown rotated 180 degrees with respect to the phase of the transmission channel Tx2. In this case, as shown on the left side of FIG. 7B, arrows $A_1$ and $A_2$ representing sum pilot signals have the same size but their directions are opposite. These arrows cancel each other when composed. As a result, the actual signal obtained by the reception apparatus 1 is one which has neither size nor direction as indicated by a circle $A_3$ in FIG. 7C.

On the other hand, the right side of FIG. 7B involving difference pilot signals shows that the arrows $A_1$ and $A_2$ have the same size and the direction. As a result, the actual signal acquired by the reception apparatus 1 is one which has a certain size and direction when composed, as indicated by an arrow $A_4$ in FIG. 7C.

That is, where the phase of the transmission channel Tx1 is rotated 180 degrees with respect to the phase of the transmission channel Tx2, phase estimation is difficult to achieve with high accuracy using sum pilot signals but can be accomplished accurately using difference pilot signals.

With the second embodiment, as shown in FIG. 6, the selector 46 outputs to the correction value calculation block 36 the enable signal corresponding to the sum CP detection signal or the difference CP detection signal in accordance with instructions from the CP group selection portion 52. In turn, the correction value calculation block 36 outputs the correction value corresponding to the phase of the sum pilot signal (sum CP) or difference pilot signal (difference CP) obtained by the phase difference calculation portion 51. Concurrently, the CP group selection portion 52 determines which of the sum pilot signal (sum CP) and the difference pilot signal (difference CP) is better suited for estimating the phase.

Illustratively, as shown in FIGS. 7A through 7C, there may be the case where the transmission channel Tx1 from the transmission apparatus $2_1$ to the reception apparatus 1 is different in status from the transmission channel Tx2 from the transmission apparatus $2_2$ to the reception apparatus 1 and where the phase of the transmission channel Tx1 is rotated 180 degrees with respect to the phase of the transmission channel Tx2 (i.e., where phases are inverted to each other). In this case, the CP group selection portion 52 determines that a sufficient amplitude value is not being obtained using sum pilot signals (e.g., k=116, 430, 518, 601, and 646 in FIG. 4) and that phase estimation cannot be accomplished with high accuracy. It is thus determined to estimate the phase using difference pilot signals (e.g., k=255, 285, 546, and 744 in FIG. 4).

The second embodiment, as explained above, permits execution of phase estimation with high accuracy by selecting either the sum pilot CP signal or the difference pilot CP signal which is deemed better suited to do the estimation. Because the correction value reflecting the estimated phase can be output to the correction circuit such as the timing synchronization correction block 32, it is possible to enhance the accuracy of the process of demodulating signals transmitted by the MISO method.

Typical Structure of the Third Embodiment of the Demodulation Unit

A typical structure of the third embodiment of the demodulation unit 21 shown in FIG. 2 is explained below in reference to FIG. 8.

FIG. 8 shows how the CP extraction block 35 and correction value calculation block 36 are typically structured to constitute the third embodiment of the demodulation unit 21 in FIG. 2.

Of the reference numerals in FIG. 8, those already used in FIG. 6 designate like or corresponding parts, and the descriptions of these parts may be omitted where redundant.

In the typical structure of FIG. 8, the CP extraction block 35 is made up of CP flag generation portions $41_1$ and $41_2$, a sum CP flag generation portion 42, AND circuits $44_1$ and $44_2$, a difference CP flag generation portion 45, a selector 46, and an OR circuit 47.

That is, the CP extraction block 35 in FIG. 8 is common to its counterpart in FIG. 6 in that it includes the same components ranging from the CP flag generation portion $41_1$ to the selector 46. The difference between the two versions of the block is that the CP extraction block 35 in FIG. 8 additionally includes the OR circuit 47 not found in the structure of FIG. 6.

In the typical structure of FIG. 8, the sum CP detection signal from the AND circuit $44_1$ and the difference CP detection signal from the AND circuit $44_2$ are input to the OR circuit 47. Upon input of either the sum CP detection signal or the difference CP detection signal, the OR circuit 47 supplies a predetermined signal (called the all CP detection signal hereunder) to the selector 46.

The selector 46 is fed with the sum CP detection signal from the AND circuit $44_1$, the difference CP detection signal from the AND circuit $44_2$, the all CP detection signal from the OR circuit 47, and the CP group selection signal from the CP group selection portion 52.

Illustratively, if "2" is input and established as the CP group selection signal and if the all CP detection signal is input from the OR circuit 47, then the selector 46 supplies the enable signal to the correction value calculation block 36. In this case, within the correction value calculation block 36, the CP group selection portion 52 is fed with the phase difference and amplitude value of all CPs (i.e., sum pilot signal (sum CP) and difference pilot signal (difference CP)).

That is, in accordance with the CP group selection signal, the output from the phase difference calculation portion 51 is classified into the sum CP group, the difference CP group, or the all CP group.

The CP group selection portion 52 determines whether a value (power value) obtained from the all CP signal, typically from the amplitude value of all CPs, is at least equal to a predetermined threshold value. The CP group selection portion 52 proceeds to supply the timing synchronization correction block 32 with the correction value reflecting the phase of all CPs based on the result of the determination.

For example, the CP group selection portion 52 determines whether a first value (first power value) obtained from the sum pilot signal (sum CP) and a second value (second power value) acquired from the difference pilot signal (difference CP) are at least equal to the predetermined threshold value. The CP group selection portion 52 calculates the correction value using the phase of the CP signal or signals of which the value or values (power values) are determined to be equal to or larger than the threshold value.

Illustratively, if both the first power value and the second power value are determined to be equal to or higher than the threshold value, the CP group selection portion 52 calculates and outputs the correction value using the phases of both the sum pilot signal (sum CP) and the difference pilot signal (difference CP). If only the first power value is determined to be equal to or higher than the threshold value, the CP group selection portion 52 calculates and outputs the correction value using the phase of the sum pilot signal (sum CP). If solely the second power value is determined to be equal to or higher than the threshold value, the CP group selection portion 52 calculates and outputs the correction value using the phase of the difference pilot signal (difference CP).

Depending illustratively on the desired confidence level of phase estimation, the CP group selection portion 52 may weight the correction value to be fed to the timing synchronization correction block 32. One weighting method may involve weighting the correction value for each CP group in reference to parameters such as the amplitude value of the CP group in question. In this case, the weight assigned to the correction value is adjusted in keeping with the parameter (e.g., amplitude value) of interest. Typically, if the parameter is found to be small, then the confidence level of phase estimation is considered low correspondingly. In the case where the parameter is found to be smaller than the predetermined threshold value, the CP group selection portion 52 then adjusts the correction value in a manner reducing the amount of correction to be attained by the correction circuit such as the timing synchronization correction block 32.

The third embodiment, as described above, permits estimation of the phase with the highest possible precision based on a choice regarding all CPs (i.e., sum pilot signal (sum CP) and difference pilot signal (difference CP)). In this case, phase estimation is carried out highly accurately by selecting both the sum pilot signal and the difference pilot signal, or either of these two signals. The correction value reflecting the phase thus estimated can then be output to the correction circuit such as the timing synchronization correction block 32, whereby the accuracy of the process of demodulating signals transmitted by the MISO method can be improved.

[Explanation of the Demodulation Process with the MISO Method in Effect]

Figure 9:
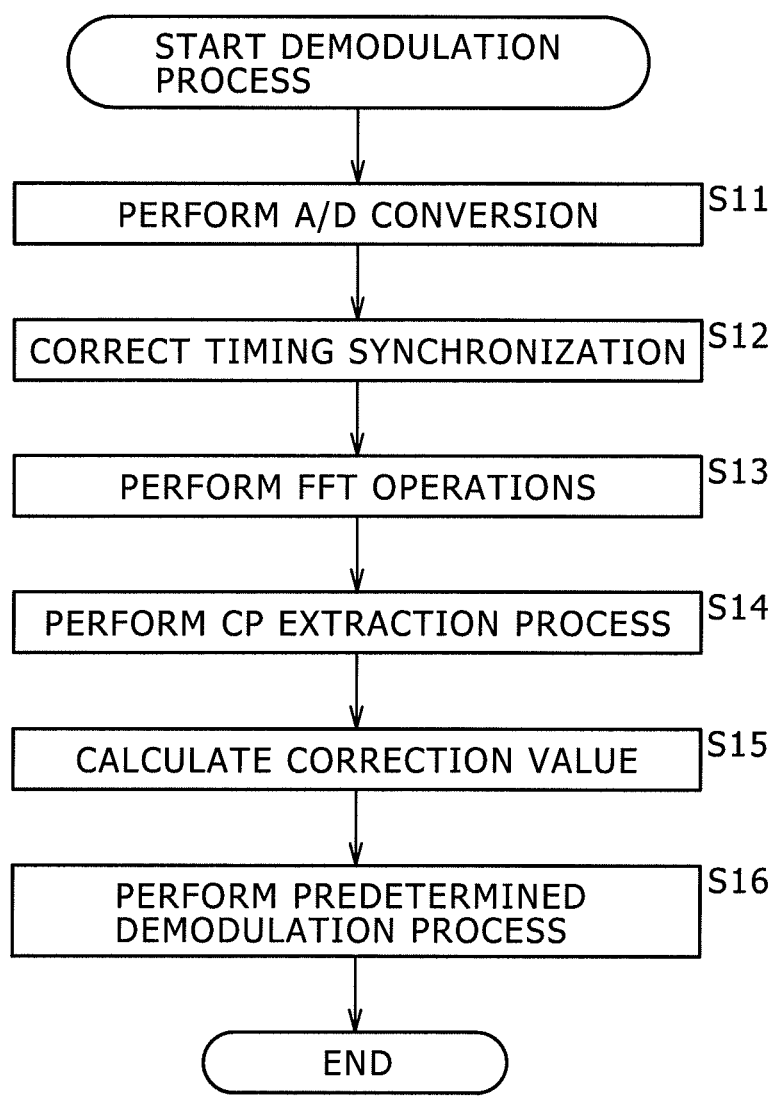
FIG. 9 is a flowchart explanatory of a demodulation process.

The demodulation process performed by the reception apparatus 1 with the MISO method in effect will now be described in reference to the flowchart of FIG. 9.

The antenna 11 receives as one OFDM signals those OFDM signals that are transmitted from the transmission apparatuses $2_1$ and $2_2$, and feeds the received OFDM signal to the acquisition section 12. The acquisition section 12 frequency-converts into an IF signal the OFDM signal (RF signal) received by the antenna 11, and supplies the resulting IF signal to the A/D conversion block 31.

In step S11, the A/D conversion block 31 performs A/D conversion of the signal coming from the acquisition section 12, and sends the resulting OFDM signal in digital form to the timing synchronization correction block 32.

In step S12, the timing synchronization correction block 32 corrects the OFDM signal from the A/D conversion block 31 in accordance with the correction value supplied from the correction value calculation block 36. The OFDM signal thus corrected is fed to the FFT block 33 and CP extraction block 35.

In step S13, based on instructions about a trigger position from the demodulation processing block 34, the FFT block 33 performs FFT operations on the corrected OFDM signal from the timing synchronization correction block 32 over a predetermined data segment. The FFT block 33 feeds the OFDM signal acquired through the FFT operations to the demodulation processing block 34.

In step S14, the CP extraction block 35 performs the process of extracting CP signals (both the sum pilot signal and the difference pilot signal, or either of them) from the OFDM signal that came from the FFT block 33 after undergoing the FFT operations. Upon extracting the CP signal from the OFDM signal, the CP extraction block 35 feeds the enable signal to the correction value calculation block 36 in synchronism with the OFDM signal in question.

When supplied with the enable signal in synchronism with the OFDM signal coming from the CP extraction block 35, the correction value calculation block 36 in step S15 obtains the phase difference of the CP signal because the OFDM signal has become the CP signal. The correction value calculation block 36 then calculates the correction value of the OFDM signal from the phase of the CP signal, and feeds the calculated correction value to the timing synchronization correction block 32.

That is, the CP extraction block 35 and correction value calculation block 36 are structured as one of the first through the third embodiments explained above. After calculating the correction value from the phase of the CP signal using one of the methods discussed above, the CP extraction block 35 and correction value calculation block 36 supply the correction value to the timing synchronization correction block 32. In keeping with the correction value fed from the correction value calculation block 36, the timing synchronization correction block 32 corrects the OFDM signal out of the A/D conversion block 31 in a feedback control setup.

In step S16, the demodulation processing block 34 calculates the trigger position from the transmission channel profile obtained by estimating the transmission channel characteristics, and sends the calculated trigger position to the FFT block 33. Also, the demodulation processing block 34 performs predetermined operations illustratively on the channel estimates of the transmission channels in order to equalize the signals sent from the transmission apparatuses $2_1$ and $2_2$. The equalized signal is fed to the error correction unit 22.

The error correction unit 22 performs an error correction process on the demodulated signal equalized by the demodulation processing block 34, and outputs the resulting transport stream (TS) to the output interface 23. The output interface 23 performs the process of outputting TS packets to the decoder 14. The encoded data contained in the TS packets are decoded by the decoder 14. The video and audio data thus decoded are supplied to the output section 15 which outputs images and sounds accordingly.

As discussed above, the reception apparatus 1 calculates the correction value for correcting the drift amount of the OFDM using the phase of the CP signal (both the sum pilot signal and the difference pilot signal, or either of them). The reception apparatus 1 proceeds to correct the drift amount of the OFDM in keeping with the correction value thus calculated.

[Typical Structures of the Reception System]

Typical structures of the reception system will now be explained in reference to FIGS. 10 through 12.

Figure 10:
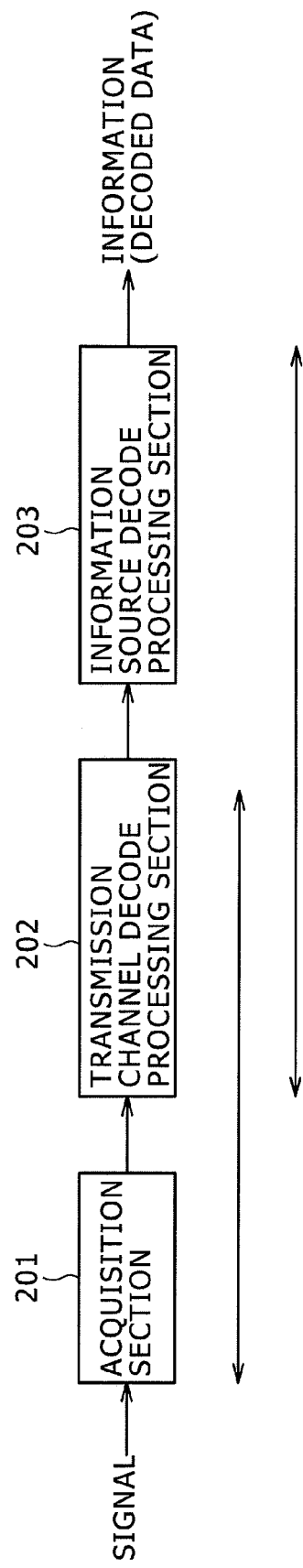
FIG. 10 is a schematic view showing a typical structure of a first embodiment of the reception system to which the present invention is applied.

FIG. 10 schematically shows a typical structure of the first embodiment of the reception system to which the present invention is applied.

In FIG. 10, the reception system is made up of an acquisition section 201, a transmission channel decode processing section 202, and an information source decode processing section 203.

The acquisition section 201 acquires signals via transmission channels such as terrestrial digital broadcasts, satellite digital broadcasts, CATV (cable television) networks, the Internet, or other networks, not shown. The acquired signal is fed to the transmission channel decode processing section 202.

Where signals are broadcast from broadcasting stations using terrestrial waves, satellite waves, CATV networks, etc., the acquisition section 201 is composed of a tuner or set-top box (STB) as in the case of the acquisition section 12 of FIG. 1. Where signals are multicast from WEB servers illustratively in the form of IPTV (Internet Protocol Television), the acquisition section 201 is constituted by a network interface such as NIC (network interface card).

When signals are broadcast from broadcasting stations using terrestrial waves, satellite waves, CATV networks, etc., the acquisition section 201 receives a single signal composed of those signals sent illustratively from a plurality of transmission apparatuses over a plurality of transmission channels.

The transmission channel decode processing section 202 performs a transmission channel decoding process on the signal acquired over the transmission channels by the acquisition section 201, the transmission channel decoding process including at least the process of estimating the channels and demodulating the signal obtained therefrom. The signal resulting from the decoding process is sent to the information source decode processing section 203.

That is, the signal acquired by the acquisition section 201 over the transmission channels turns out to be distorted under the influence of transmission channel characteristics. The transmission channel decode processing section 202 thus performs its decode processing such as transmission channel estimation, channel estimation, and phase estimation on that signal.

The transmission channel decoding process may include the process of correcting errors that may have occurred on the transmission channels. Typical error correction schemes include LDPC coding and Reed-Solomon coding.

The information source decode processing section 203 performs an information source decoding process on the signal having undergone the transmission channel decoding process, the information source decoding process including at least the process of expanding compressed information into the original information.

That is, the signal acquired by the acquisition section 201 over the transmission channels may have undergone a compression encoding process whereby the amount of the video and audio data constituting the information of the signal in question was reduced. In such a case, the information source decode processing section 203 performs the information source decoding process including the process of expanding compressed information into the original information (i.e., expansion process) on the signal having undergone the transmission channel decoding process.

If the signal acquired by the acquisition section 201 over the transmission channels is not found compression-encoded, then the information source decode processing section 203 does not perform the information expansion process.

Illustratively, the process of information expansion may involve MPEG decoding. The transmission channel decoding process may further include descrambling in addition to the expansion process.

In the reception system structured as described above, the acquisition section 201 acquires over the transmission channels the signal containing illustratively the video and audio data having undergone compression encoding such as MPEG encoding as well as error-correcting code processing. The acquired signal is forwarded to the transmission channel decode processing section 202. At this point, the signal is found acquired in a distorted manner under the influence of transmission channel characteristics.

The transmission channel decode processing section 202 performs the same transmission channel decoding process as the one carried out by the transmission channel decode processing section 13 in FIG. 1 on the signal coming from the acquisition section 201. The signal resulting from the transmission channel decoding process is sent to the information source decode processing section 203.

The information source decode processing section 203 performs the same information source decoding process as the one carried out by the decoder 14 in FIG. 1 on the signal coming from the transmission channel decode processing section 202. The information source decode processing section 203 outputs images or sounds resulting from the information source decoding process.

The above-described reception system of FIG. 10 may be applied illustratively to TV tuners for receiving digital TV broadcasts.

The acquisition section 201, transmission channel decode processing section 202, and information source decode processing section 203 may each be structured as an independent apparatus (a hardware module such as an IC (integrated circuit) or a software module).

Some or all of the acquisition section 201, transmission channel decode processing section 202, and information source decode processing section 203 may be set up in combination as an independent apparatus. That is, a set of the acquisition section 201 and transmission channel decode processing section 202, a set of the transmission channel decode processing section 202 and information source decode processing section 203, or a set of the acquisition section 201, transmission channel decode processing section 202, and information source decode processing section 203 may be formed into a single independent apparatus.

Figure 11:
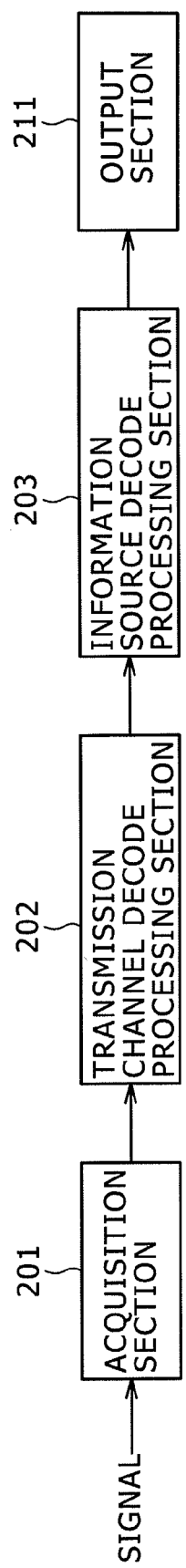
FIG. 11 is a schematic view showing a typical structure of a second embodiment of the reception system to which the present invention is applied.

FIG. 11 schematically shows a typical structure of the second embodiment of the reception system to which the present invention is applied.

Of the reference numerals in FIG. 11, those already used in FIG. 10 designate like or corresponding parts, and the descriptions of these parts may be omitted where redundant.

The reception system in FIG. 11 is common to its counterpart in FIG. 10 in that it includes the acquisition section 201, transmission channel decode processing section 202, and information source decode processing section 203. The difference between the two versions of the reception system is that the reception system in FIG. 11 additionally includes an output section 211.

The output section 211 is illustratively composed of a display device for displaying images and/or of speakers for outputting sounds. As such, the output section 211 outputs the images and sounds represented by the signal output from the information source decode processing section 203. In short, what the output section 211 does is to display images and/or output sounds.

The above-described reception system in FIG. 11 may be applied illustratively to TV sets for receiving digital TV broadcasts or to radio receivers for receiving radio broadcasts.

If the signal acquired by the acquisition section 201 is not found to be compression-encoded, then the signal output by the transmission channel decode processing section 202 is sent directly to the output section 211.

Figure 12:
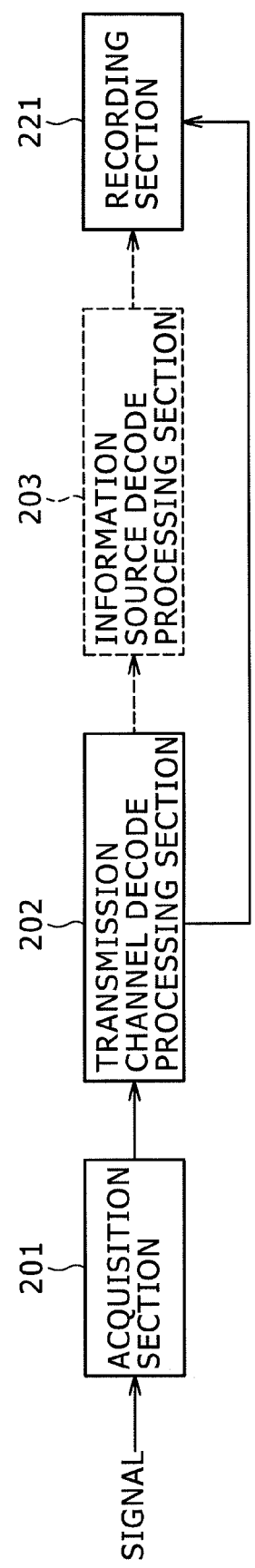
FIG. 12 is a schematic view showing a typical structure of a third embodiment of the reception system to which the present invention is applied.

FIG. 12 schematically shows a typical structure of the third embodiment of the reception system to which the present invention is applied.

Of the reference numerals in FIG. 12, those already used in FIG. 10 designate like or corresponding parts, and the descriptions of these parts may be omitted where redundant.

The reception system in FIG. 12 is common to its counterpart in FIG. 10 in that it includes the acquisition section 201 and transmission channel decode processing section 202.

The difference between the two versions of the reception system is that the reception system in FIG. 12 lacks the information source decode processing section 203 but additionally includes a recording section 221.

The recording section 221 records (i.e., stores) the signal output from the transmission channel decode processing section 202 (such as TS packets of MPEG transport streams) to recording (i.e., storage) media including optical disks, hard disks (magnetic disks), and flash memories.

The reception system in FIG. 12 may be applied illustratively to recorders for recording TV broadcasts.

In FIG. 12, the reception system may be structured alternatively to include the information source decode processing section 203. In this setup, the information source decode processing section 203 performs the information source decoding process on the received signal, so that the images and sounds acquired from the decoded signal can be recorded by the recording section 221.

The foregoing paragraphs have described the typical cases in which the embodiments of the present invention is applied to the reception apparatus for receiving the OFDM signal transmitted by the MISO method under DVB-T.2. Alternatively, the invention may also be adopted by any other apparatus for receiving signals transmitted by the MISO method. Although the above-described embodiments of the invention each involve one reception apparatus (with one antenna) receiving signals transmitted by two transmission apparatuses, this is not limitative of the present invention. Alternatively, there may be provided not two but any number of transmission apparatuses on the transmitting side.

Although the above embodiments of the present invention were shown calculating the correction value by use of the CP signal, this is not limitative of the invention. Alternatively, any pilot signal (known signal) included in the OFDM signal transmitted by the MISO method may be utilized in place of the CP signal. For example, the SP signal may be adopted instead of the CP signal.

The series of the processes described above may be executed either by hardware or by software. Where the processes are to be carried out by software, the programs constituting the software are installed into suitable computers for process execution. Such computers include one with the relevant software installed beforehand in its dedicated hardware, and a general-purpose personal computer or like equipment capable of executing diverse functions based on the programs installed therein.

Figure 13:
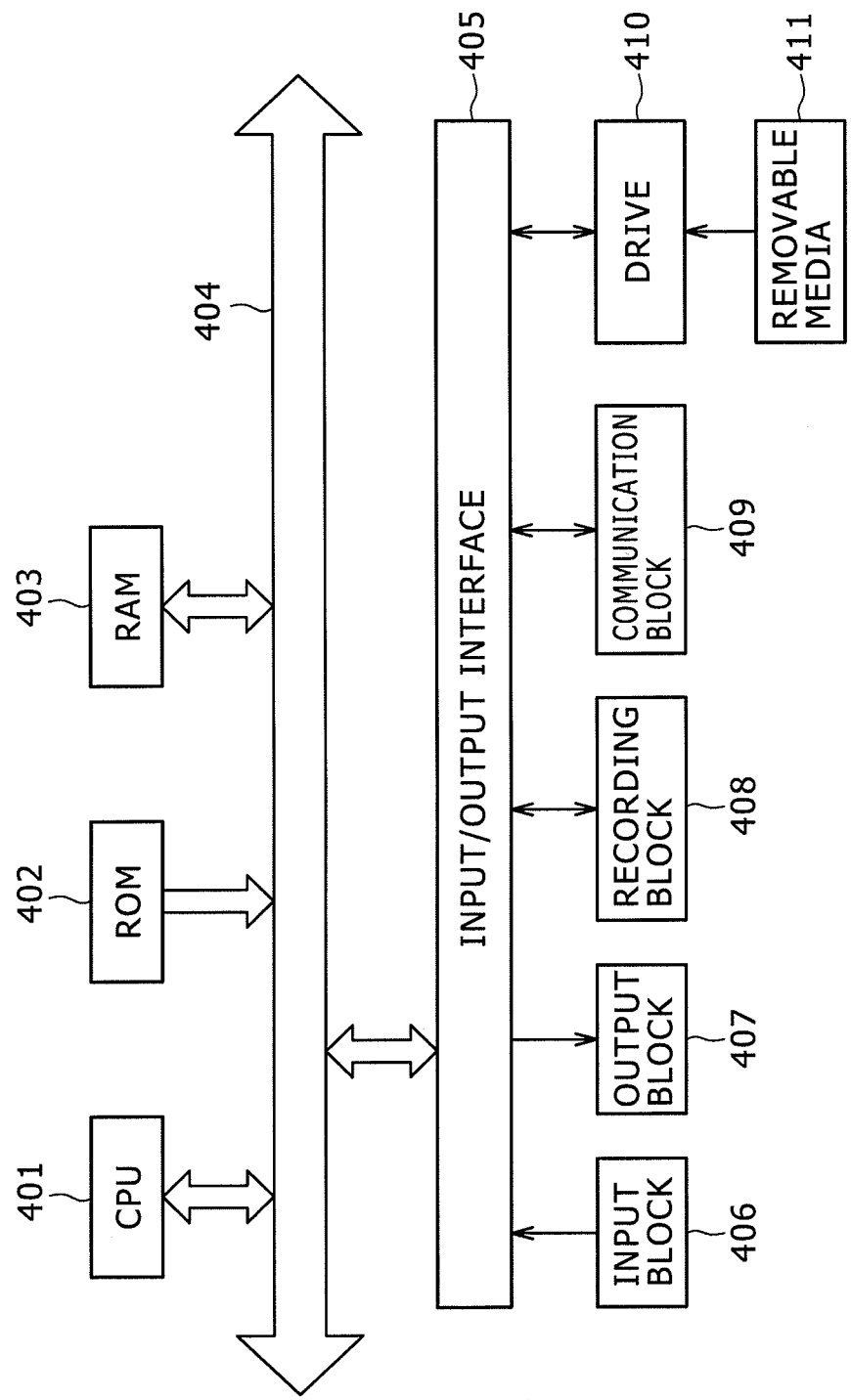
FIG. 13 is a block diagram showing a typical hardware structure of a computer.

FIG. 13 shows a typical hardware structure of a computer for executing the series of the above-described processes using programs.

In the computer, a CPU (central processing unit) 401, a ROM (read only memory) 402, and a RAM (random access memory) 403 are interconnected by a bus 404.

An input/output interface 405 is further connected to the bus 404. The input/output interface 405 is connected with an input block 406, an output block 407, a storage block 408, a communication block 409, and a drive 410.

The input block 406 is typically composed of a keyboard, a mouse, and a microphone. The output block 407 is typically made up of a display and speakers. The storage block 408 is illustratively constituted by a hard disk or a nonvolatile memory. The communication block 409 is formed illustratively by a network interface. The drive 410 is used to drive removable media 411 such as a magnetic disk, an optical disk, a magneto-optical disk, or a semiconductor memory. The computer structured as outlined above has the series of the above-described processes carried out illustratively by the CPU 401 loading the appropriate programs from the storage block 408 into the RAM 403 for execution via the input/output interface 405 and bus 404.

Illustratively, the programs to be executed by the computer (i.e., by the CPU 401) may be offered recorded on the removable media 411 such as package media. Alternatively, the programs may be offered via wired or wireless transmission media including local area networks, the Internet, and digital broadcasts.

In the computer, the programs may be retrieved from the removable media 411 loaded in the drive 410 and installed into the storage block 408 by way of the input/output interface 405. Alternatively, the programs may be received by the communication block 409 via wired or wireless communication media and installed into the storage block 408. As another alternative, the programs may be preinstalled in the ROM 402 or storage block 408.

In this specification, the steps describing the programs stored on the recording medium represent not only the processes that are to be carried out in the depicted sequence (i.e., on a time series basis) but also processes that may be performed parallelly or individually and not chronologically.

In this specification, the term "system" refers to an entire configuration made up of a plurality of component devices.

The present application contains subject matter related to that disclosed in Japanese Priority Patent Application JP 2009-173610 filed in the Japan Patent Office on Jul. 24, 2009, the entire content of which is hereby incorporated by reference.

It should be understood by those skilled in the art that various modifications, combinations, sub-combinations and alternations may occur depending on design requirements and other factors insofar as they are within the scope of the appended claims or the equivalent thereof.

What is claimed is:

1. A reception apparatus comprising:
   acquisition means for acquiring an orthogonal frequency division multiplexing signal composed resultingly of signals transmitted by an orthogonal frequency division multiplexing method from a plurality of transmission apparatuses;
   correction value calculation means for calculating a correction value for correcting a drift amount of said orthogonal frequency division multiplexing signal using a phase of either a first pilot signal or a second pilot signal extracted from the acquired orthogonal frequency division multiplexing signal, said first pilot signal being obtained from pilot signals which are in phase with one another coming from said plurality of transmission apparatuses, said second pilot signal being acquired from pilot signals which are out of phase with one another coming from said plurality of transmission apparatuses; and
   correction means for correcting said drift amount of said orthogonal frequency division multiplexing signal in accordance with the calculated correction value, and
   wherein, if said plurality of transmission apparatuses have the same transmission channel status, said correction value calculation means calculates said correction value using the phase of said first pilot signal, and
   wherein, if said plurality of transmission apparatuses are different from one another in terms of transmission channel status, with the phases of the transmission channels of said transmission apparatuses inverted with respect to one another, then said correction value calculation means calculates said correction value using the phase of said second pilot signal.

2. The reception apparatus according to claim 1, wherein all of said pilot signals are Continual Pilot (CP) signals.

3. A reception method comprising:
   acquiring, using a reception hardware apparatus, an orthogonal frequency division multiplexing signal composed resultingly of signals transmitted by an orthogonal frequency division multiplexing method from a plurality of transmission apparatuses;

calculating a correction value for correcting a drift amount of said orthogonal frequency division multiplexing signal using a phase of either a first pilot signal or a second pilot signal extracted from the acquired orthogonal frequency division multiplexing signal, said first pilot signal being obtained from pilot signals which are in phase with one another coming from said plurality of transmission apparatuses, said second pilot signal being acquired from pilot signals which are out of phase with one another coming from said plurality of transmission apparatuses; and correcting said drift amount of said orthogonal frequency division multiplexing signal in accordance with the calculated correction value, and wherein, if said plurality of transmission apparatuses have the same transmission channel status, said correction value calculation step calculates said correction value using the phase of said first pilot signal, and wherein, if said plurality of transmission apparatuses are different from one another in terms of transmission channel status, with the phases of the transmission channels of said transmission apparatuses inverted with respect to one another, then said correction value calculation step calculates said correction value using the phase of said second pilot signal.

4. A non-transitory computer readable medium including a program embodied on the non-transitory computer readable medium, that when executed, causes a computer to execute a method comprising:

acquiring an orthogonal frequency division multiplexing signal composed resultingly of signals transmitted by an orthogonal frequency division multiplexing method from a plurality of transmission apparatuses;

calculating a correction value for correcting a drift amount of said orthogonal frequency division multiplexing signal using a phase of either a first pilot signal or a second pilot signal extracted from the acquired orthogonal frequency division multiplexing signal, said first pilot signal being obtained from pilot signals which are in phase with one another coming from said plurality of transmission apparatuses, said second pilot signal being acquired from pilot signals which are out of phase with one another coming from said plurality of transmission apparatuses; and correcting said drift amount of said orthogonal frequency division multiplexing signal in accordance with the calculated correction value, and wherein, if said plurality of transmission apparatuses have the same transmission channel status, said correction value calculation step calculates said correction value using the phase of said first pilot signal, and wherein, if said plurality of transmission apparatuses are different from one another in terms of transmission channel status, with the phases of the transmission channels of said transmission apparatuses inverted with respect to one another, then said correction value calculation step calculates said correction value using the phase of said second pilot signal.

5. A reception apparatus comprising:

acquisition means for acquiring an orthogonal frequency division multiplexing signal composed resultingly of signals transmitted by an orthogonal frequency division multiplexing method from a plurality of transmission apparatuses;

determination means for determining whether a first value and a second value are equal to or larger than a predetermined threshold value, said first value being obtained from a first pilot signal acquired from pilot signals which are in phase with one another extracted from the acquired orthogonal frequency division multiplexing signal coming from said plurality of transmission apparatuses, said second value being obtained from a second pilot signal acquired from pilot signals which are out of phase with one another extracted from the acquired orthogonal frequency division multiplexing signal coming from said plurality of transmission apparatuses;

correction value calculation means for calculating a correction value for correcting a drift amount of said orthogonal frequency division multiplexing signal using the phase of the pilot signal from which the value determined to be equal to or larger than said predetermined threshold value has been obtained; and correction means for correcting said drift amount of said orthogonal frequency division multiplexing signal in accordance with the calculated correction value.

6. The reception apparatus according to claim 5, wherein said correction value calculation means weights said correction value based on either said first vague or said second value.

7. The reception apparatus according to claim 5, wherein all of said pilot signals are Continual Pilot (CP) signals.

8. A reception method comprising:

acquiring, using a reception hardware apparatus, an orthogonal frequency division multiplexing signal composed resultingly of signals transmitted by an orthogonal frequency division multiplexing method from a plurality of transmission apparatuses;

determining whether a first value and a second value are equal to or larger than a predetermined threshold value, said first value being obtained from a first pilot signal acquired from pilot signals which are in phase with one another extracted from the acquired orthogonal frequency division multiplexing signal coming from said plurality of transmission apparatuses, said second value being obtained from a second pilot signal acquired from pilot signals which are out of phase with one another extracted from the acquired orthogonal frequency division multiplexing signal coming from said plurality of transmission apparatuses;

calculating a correction value for correcting a drift amount of said orthogonal frequency division multiplexing signal using the phase of the pilot signal from which the value determined to be equal to or larger than said predetermined threshold value has been obtained; and correcting said drift amount of said orthogonal frequency division multiplexing signal in accordance with the calculated correction value.

9. A non-transitory computer readable medium including a program embodied on the non-transitory computer readable medium, that when executed, causes a computer to execute a method comprising:

acquiring an orthogonal frequency division multiplexing signal composed resultingly of signals transmitted by an orthogonal frequency division multiplexing method from a plurality of transmission apparatuses;

determining whether a first value and a second value are equal to or larger than a predetermined threshold value, said first value being obtained from a first pilot signal acquired from pilot signals which are in phase with one another extracted from the acquired orthogonal frequency division multiplexing signal coming from said plurality of transmission apparatuses, said second value being obtained from a second pilot signal acquired from pilot signals which are out of phase with one another extracted from the acquired orthogonal frequency division multiplexing signal coming from said plurality of transmission apparatuses;

calculating a correction value for correcting a drift amount of said orthogonal frequency division multiplexing signal using the phase of the pilot signal from which the value determined to be equal to or larger than said predetermined threshold value has been obtained; and correcting said drift amount of said orthogonal frequency division multiplexing signal in accordance with the calculated correction value.

10. A reception system comprising:

acquisition means for acquiring signals via a transmission channel; and a transmission channel decode processing section configured to perform a transmission channel decoding process including at least a demodulation process on the signal acquired via said transmission channel, wherein the signal acquired via said transmission channel is an orthogonal frequency division multiplexing signal composed resultingly of signals transmitted by an orthogonal frequency division multiplexing method from a plurality of transmission apparatuses via a plurality of transmission channels, and said transmission channel decode processing section includes correction value calculation means for calculating a correction value for correcting a drift amount of said orthogonal frequency division multiplexing signal using a phase of either a first pilot signal or a second pilot signal extracted from the acquired orthogonal frequency division multiplexing signal, said first pilot signal being obtained from pilot signals which are in phase with one another coming from said plurality of transmission apparatuses, said second pilot signal being acquired from pilot signals which are out of phase with one another coming from said plurality of transmission apparatuses, and correction means for correcting said drift amount of said orthogonal frequency division multiplexing signal in accordance with the calculated correction value, and wherein, if said plurality of transmission apparatuses have the same transmission channel status, said correction value calculation means calculates said correction value using the phase of said first pilot signal, and wherein, if said plurality of transmission apparatuses are different from one another in terms of transmission channel status, with the phases of the transmission channels of said transmission apparatuses inverted with respect to one another, then said correction value calculation means calculates said correction value using the phase of said second pilot signal.

11. A reception system comprising:

a transmission channel decode processing section configured to perform a transmission channel decoding process including at least a demodulation process on a signal acquired via a transmission channel; and an output section configured to output images or sounds based on the signal undergone said transmission channel decoding process, wherein said signal acquired via said transmission channel is an orthogonal frequency division multiplexing signal composed resultingly of signals transmitted by an orthogonal frequency division multiplexing method from a plurality of transmission apparatuses via a plurality of transmission channels, and said transmission channel decode processing section includes correction value calculation means for calculating a correction value for correcting a drift amount of said orthogonal frequency division multiplexing signal using a phase of either a first pilot signal or a second pilot signal extracted from the acquired orthogonal frequency division multiplexing signal, said first pilot signal being obtained from pilot signals which are in phase with one another coming from said plurality of transmission apparatuses, said second pilot signal being acquired from pilot signals which are out of phase with one another coming from said plurality of transmission apparatuses, and correction means for correcting said drift amount of said orthogonal frequency division multiplexing signal in accordance with the calculated correction value, and wherein, if said plurality of transmission apparatuses have the same transmission channel status, said correction value calculation means calculates said correction value using the phase of said first pilot signal, and wherein, if said plurality of transmission apparatuses are different from one another in terms of transmission channel status, with the phases of the transmission channels of said transmission apparatuses inverted with respect to one another, then said correction value calculation means calculates said correction value using the phase of said second pilot signal.

12. A reception system comprising:

a transmission channel decode processing section configured to perform a transmission channel decoding process including at least a demodulation process on a signal acquired via a transmission channel; and a recording section configured to record the signal having undergone said transmission channel decoding process, wherein said signal acquired via said transmission channel is an orthogonal frequency division multiplexing signal composed resultingly of signals transmitted by an orthogonal frequency division, multiplexing method from a plurality of transmission apparatuses via a plurality of transmission channels, and said transmission channel decode processing section includes correction value calculation means for calculating a correction value for correcting a drift amount of said orthogonal frequency division multiplexing signal using a phase of either a first pilot signal or a second pilot signal extracted from the acquired orthogonal frequency division multiplexing signal, said first pilot signal being obtained from pilot signals which are in phase with one another coming from said plurality of transmission apparatuses, said second pilot signal being acquired from pilot signals which are out of phase with one another coming from said plurality of transmission apparatuses, and correction means for correcting said drift amount of said orthogonal frequency division multiplexing signal in accordance with the calculated correction value, and wherein, if said plurality of transmission apparatuses have the same transmission channel status, said correction value calculation means calculates said correction value using the phase of said first pilot signal, and wherein, if said plurality of transmission apparatuses are different from one another in terms of transmission channel status, with the phases of the transmission channels of said transmission apparatuses inverted with respect to one another, then said correction value calculation means calculates said correction value using the phase of said second pilot signal.

13. A reception apparatus comprising:

an acquisition hardware section configured to acquire an orthogonal frequency division multiplexing signal composed resultingly of signals transmitted by an orthogonal frequency division multiplexing method from a plurality of transmission apparatuses;

a correction value calculation hardware block configured to calculate a correction value for correcting a drift amount of said orthogonal frequency division multiplexing signal using a phase of either a first pilot signal or a second pilot signal extracted from the acquired orthogonal frequency division multiplexing signal, said first pilot signal being obtained from pilot signals which are in phase with one another coming from said plurality of transmission apparatuses, said second pilot signal being acquired from pilot signals which are out of phase with one another coming from said plurality of transmission apparatuses; and a correction block configured to correct said drift amount of said orthogonal frequency division multiplexing signal in accordance with the calculated correction value, and wherein, if said plurality of transmission apparatuses have the same transmission channel status, said correction value calculation hardware block calculates said correction value using the phase of said first pilot signal, and wherein, if said plurality of transmission apparatuses are different from one another in terms of transmission channel status, with the phases of the transmission channels of said transmission apparatuses inverted with respect to one another, then said correction value calculation hardware block calculates said correction value using the phase of said second pilot signal.

14. A reception apparatus comprising:

an acquisition hardware section configured to acquire an orthogonal frequency division multiplexing signal composed resultingly of signals transmitted by an orthogonal frequency division multiplexing method from a plurality of transmission apparatuses;

a determination portion configured to determine whether a first value and a second value are equal to or larger than a predetermined threshold value, said first value being obtained from a first pilot signal acquired from pilot signals which are in phase with one another coming from said plurality of transmission apparatuses, said second value being obtained from a second pilot signal acquired from pilot signals which are out of phase with one another coming from said plurality of transmission apparatuses;

a correction value calculation hardware block configured to calculate a correction value for correcting a drift amount of said orthogonal frequency division multiplexing signal using the phase of the pilot signal from which the value determined to be equal to or larger than said predetermined threshold value has been obtained; and a correction unit configured to correct said drift amount of said orthogonal frequency division multiplexing signal in accordance with the calculated correction value.

* * * * *